United States Patent
Li et al.

(10) Patent No.: US 9,094,977 B2
(45) Date of Patent: Jul. 28, 2015

(54) APPARATUS AND METHOD FOR SUPPORTING MOBILITY MANAGEMENT IN COMMUNICATION SYSTEMS WITH LARGE NUMBER OF ANTENNAS

(71) Applicant: Samsung Electronics Co., Ltd., Suwon-si, Gyeonggi-do (KR)

(72) Inventors: Ying Li, Richardson, TX (US); Zhouyue Pi, Allen, TX (US); Kaushik Josiam, Dallas, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 159 days.

(21) Appl. No.: 13/660,697

(22) Filed: Oct. 25, 2012

(65) Prior Publication Data

US 2013/0121185 A1 May 16, 2013

Related U.S. Application Data

(60) Provisional application No. 61/558,886, filed on Nov. 11, 2011.

(51) Int. Cl.
*H04W 72/04* (2009.01)
*H04W 24/10* (2009.01)
*H04W 72/08* (2009.01)

(52) U.S. Cl.
CPC ............ *H04W 72/046* (2013.01); *H04W 24/10* (2013.01); *H04W 72/08* (2013.01)

(58) Field of Classification Search
CPC .... H04W 24/10; H04W 72/046; H04W 72/08
USPC ................................................ 370/252, 253
See application file for complete search history.

(56) References Cited

U.S. PATENT DOCUMENTS

| | | | |
|---|---|---|---|
| 2007/0249402 A1* | 10/2007 | Dong et al. | 455/562.1 |
| 2008/0318606 A1* | 12/2008 | Tsutsui et al. | 455/500 |
| 2010/0033374 A1 | 2/2010 | van Rensburg et al. | |
| 2010/0075705 A1 | 3/2010 | van Rensburg et al. | |
| 2010/0118807 A1* | 5/2010 | Seo et al. | 370/329 |
| 2010/0177725 A1 | 7/2010 | van Rensburg | |
| 2012/0309402 A1* | 12/2012 | Cheng et al. | 455/450 |
| 2013/0182654 A1* | 7/2013 | Hariharan et al. | 370/329 |
| 2013/0201964 A1* | 8/2013 | Kim et al. | 370/335 |

OTHER PUBLICATIONS

International Search Report dated Mar. 25, 2013 in connection with International Patent Application No. PCT/KR2012/009334, 3 pages.
Written Opinion of the International Searching Authority dated Mar. 25, 2013 in connection with International Patent Application No. PCT/KR2012/009334, 5 pages.
3GPP TSG RAN WG1 Meeting #47, "Downlink L1/L2 Control Signaling", R1-063619, Nov. 6-10, 2006, Riga, Latvia, 5 pages.

* cited by examiner

*Primary Examiner* — Gary Mui

(57) ABSTRACT

A base station and mobile station are configured to perform control beam association. A method at the base station includes transmitting at least one first control beam including reference signals on which the mobile station can perform a measurement. The method also includes receiving a first measurement report from the mobile station of the at least one first control beam. The method further includes, based on the first measurement report, selecting at least one of the at least one first control beam for at least one control channel for the mobile station to associate with. The method still further includes transmitting control information in the at least one control channel to the mobile station using the at least one selected control beam, the control information comprising at least one resource allocation indication for the mobile station. The at least one selected control beam is associated to the mobile station.

28 Claims, 20 Drawing Sheets

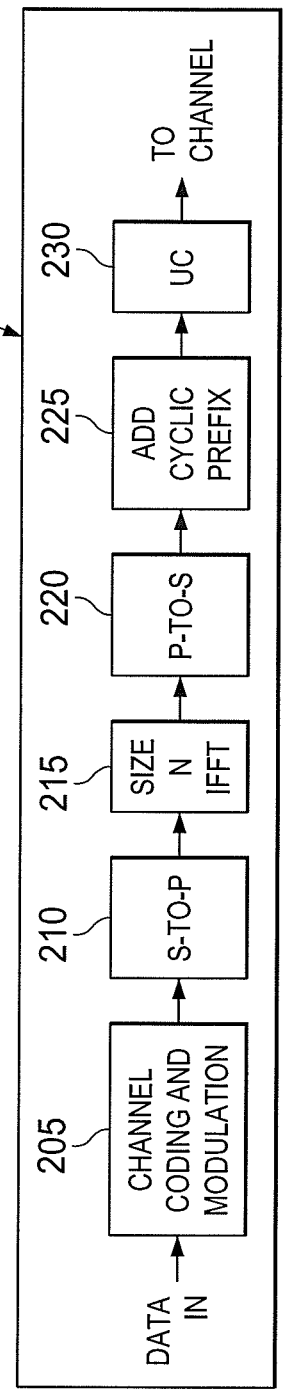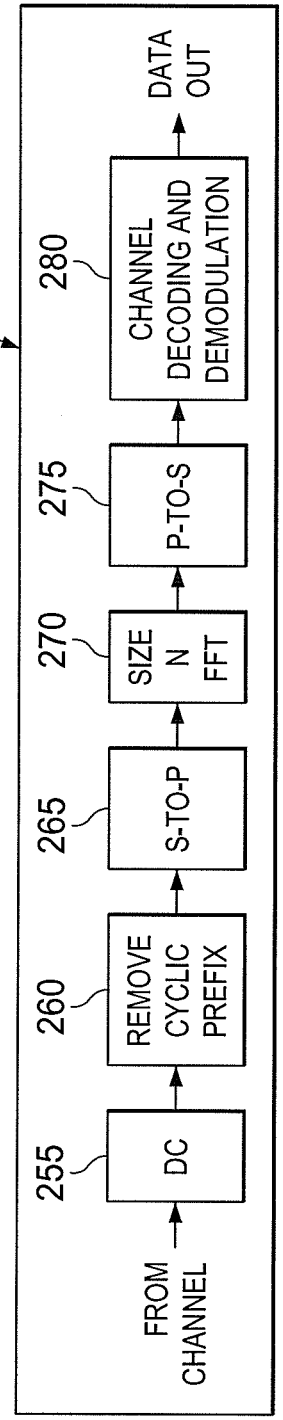

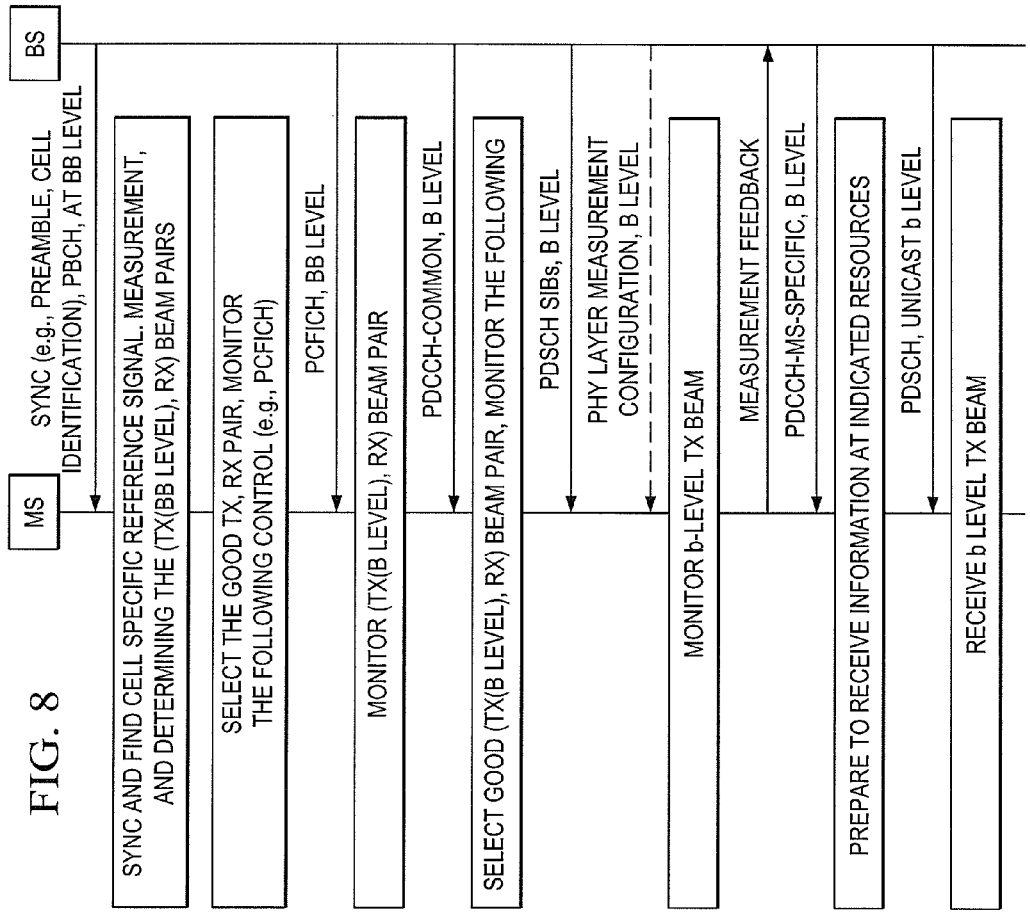
FIG. 8
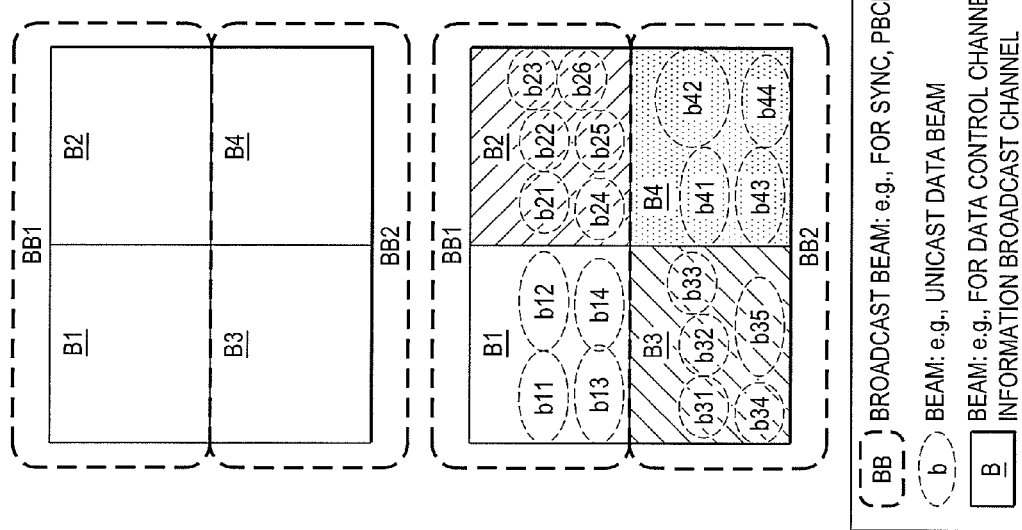

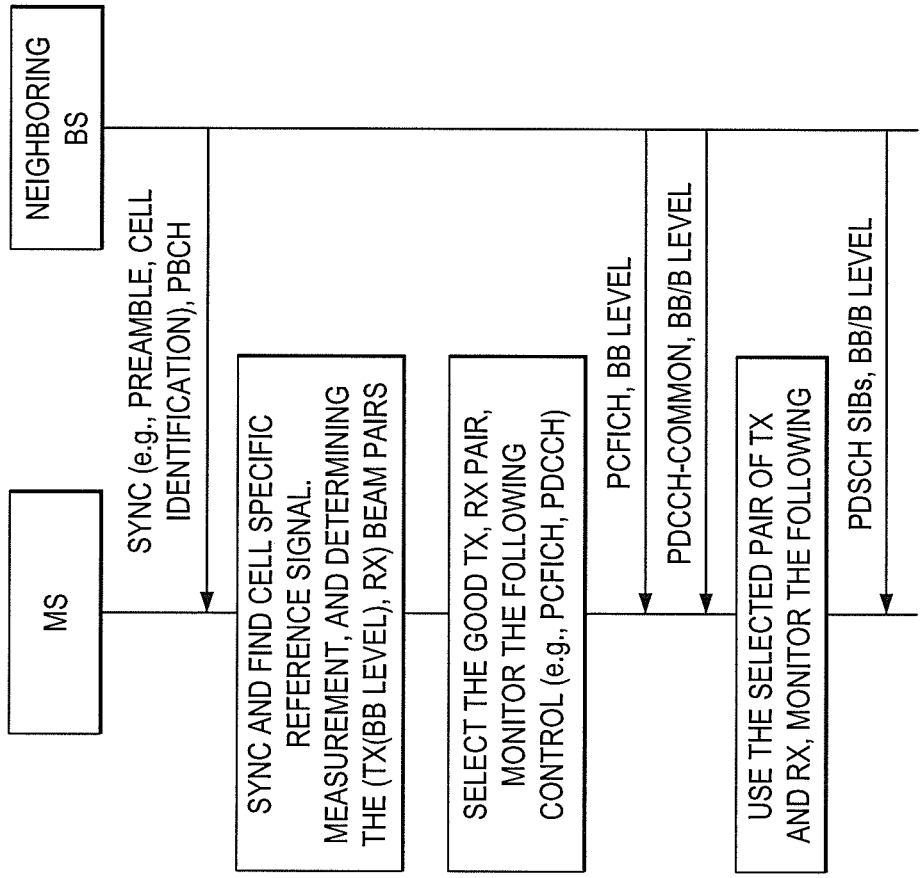
FIG. 9A
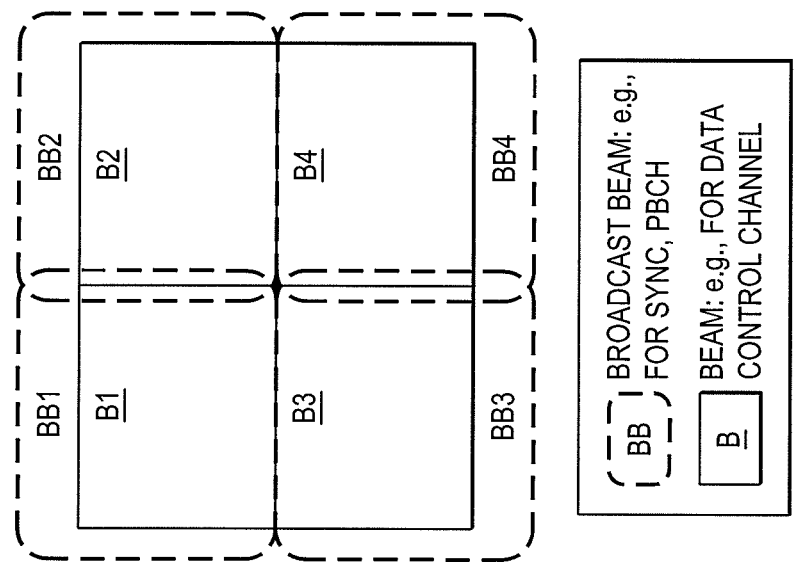

FIG. 9B
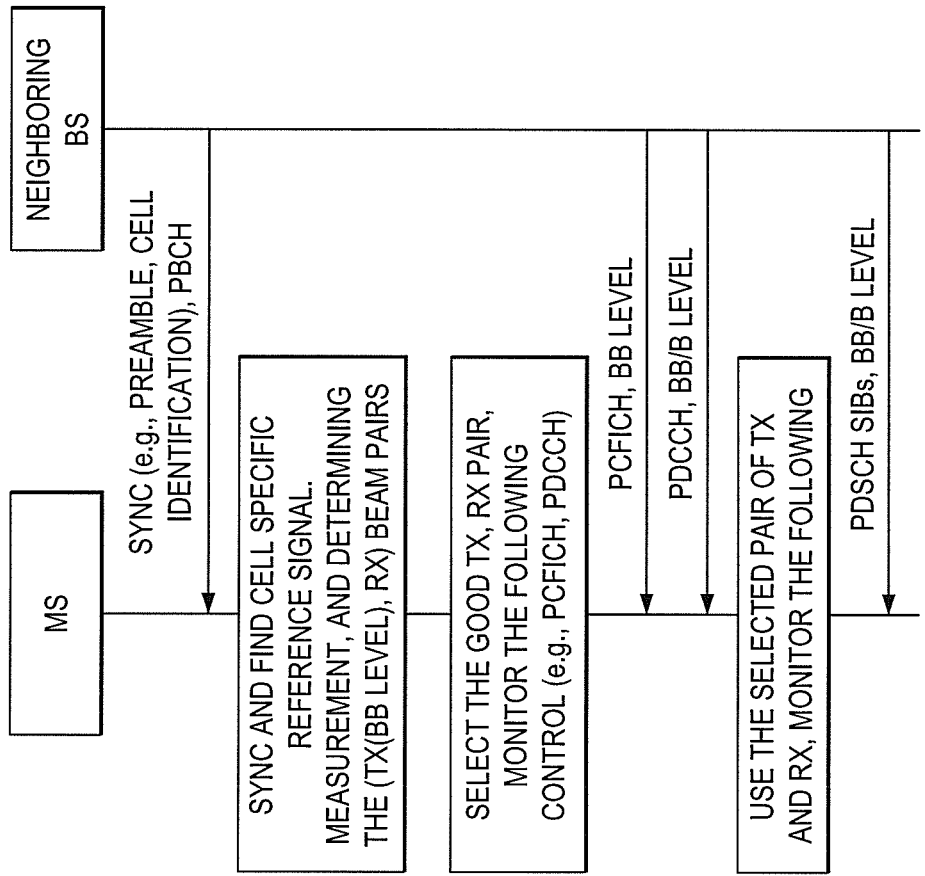
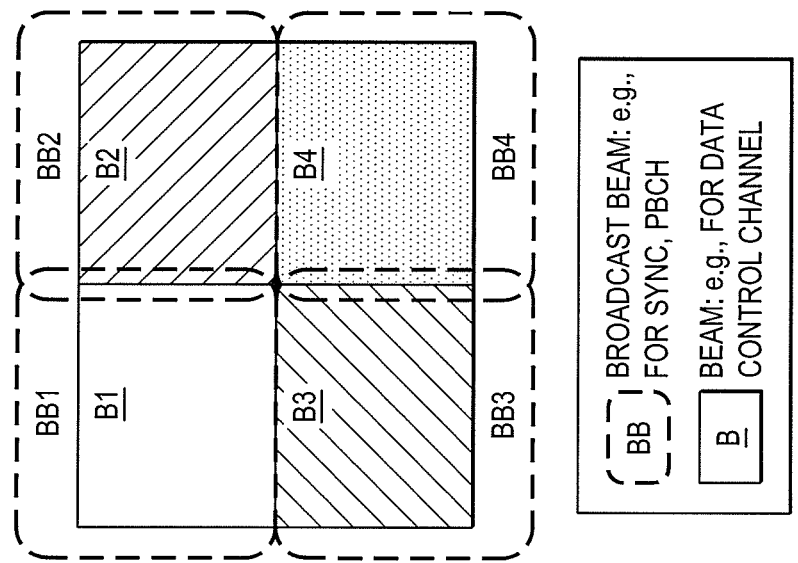

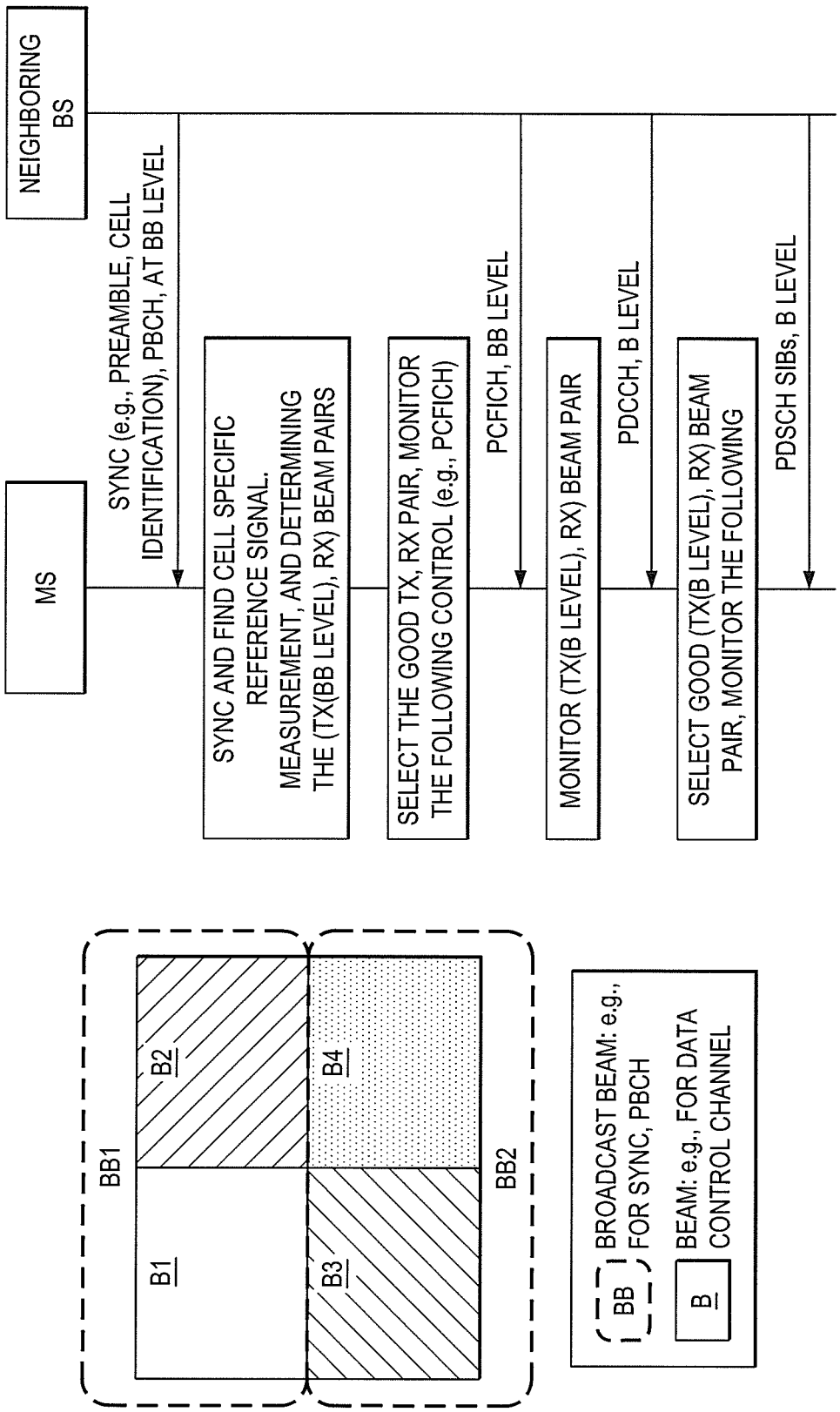

APPARATUS AND METHOD FOR
SUPPORTING MOBILITY MANAGEMENT IN
COMMUNICATION SYSTEMS WITH LARGE
NUMBER OF ANTENNAS

CROSS-REFERENCE TO RELATED
APPLICATION(S) AND CLAIM OF PRIORITY

The present application claims priority to U.S. Provisional Patent Application No. 61/558,886, filed Nov. 11, 2011, entitled "METHODS AND APPARATUS TO SUPPORT CELL MONITORING IN MILLIMETER WAVE WIDEBAND COMMUNICATIONS". The content of the above-identified patent documents is incorporated herein by reference.

TECHNICAL FIELD

The present application relates generally to wireless communication and, more specifically, to an apparatus and method for supporting mobility management in communication systems with large number of antennas.

BACKGROUND

Wireless communication has been one of the most successful innovations in modern history. Recently, the number of subscribers to wireless communication services exceeded 5 billion and continues to grow quickly. The demand of wireless data traffic is rapidly increasing due to growing popularity among consumers and businesses of smart phones and other mobile data devices, such as tablets, "note pad" computers, net books, and eBook readers. In order to meet the high growth in mobile data traffic, improvements in radio interface efficiency and allocation of new spectrum is of paramount importance.

SUMMARY

For use by a base station in a wireless network, a method for associating control beams to a mobile station is provided. The method includes transmitting at least one first control beam including reference signals on which the mobile station can perform a measurement. The method also includes receiving a first measurement report from the mobile station of the at least one first control beam. The method further includes, based on the first measurement report, selecting at least one of the at least one first control beam for at least one control channel for the mobile station to associate with. The method still further includes transmitting control information in the at least one control channel to the mobile station using the at least one selected control beam, the control information comprising at least one resource allocation indication for the mobile station. The at least one selected control beam is associated to the mobile station.

A base station configured to associate control beams to a mobile station in a wireless network is provided. The base station includes a processor configured to transmit at least one first control beam including reference signals on which the mobile station can perform a measurement. The processor is also configured to receive a first measurement report from the mobile station of the at least one first control beam. The processor is further configured to, based on the first measurement report, select at least one of the at least one first control beam for at least one control channel for the mobile station to associate with. The processor is still further configured to transmit control information in the at least one control channel to the mobile station using the at least one selected control beam, the control information comprising at least one resource allocation indication for the mobile station. The at least one selected control beam is associated to the mobile station.

For use by a mobile station in a wireless network, a method for associating control beams is provided. The method includes receiving from a base station at least one first control beam comprising a plurality of reference signals. The method also includes performing a measurement on the reference signals. The method further includes transmitting a first measurement report of the at least one first control beam, the first measurement report configured to be used by the base station to select at least one of the at least one first control beam for at least one control channel for the mobile station to associate with. The method still further includes receiving control information in the at least one control channel using the at least one selected control beam, the control information comprising at least one resource allocation indication for the mobile station. The at least one selected control beam is associated to the mobile station.

A mobile station configured to associate control beams in a wireless network is provided. The mobile station includes a processor configured to receive from a base station at least one first control beam comprising a plurality of reference signals. The processor is also configured to perform a measurement on the reference signals. The processor is further configured to transmit a first measurement report of the at least one first control beam, the first measurement report configured to be used by the base station to select at least one of the at least one first control beam for at least one control channel for the mobile station to associate with. The processor is still further configured to receive control information in the at least one control channel using the at least one selected control beam, the control information comprising at least one resource allocation indication for the mobile station. The at least one selected control beam is associated to the mobile station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A is a high-level diagram of an orthogonal frequency division multiple access (OFDMA) or millimeter wave transmit path, according to embodiments of this disclosure;

FIG. 2B is a high-level diagram of an OFDMA or millimeter wave receive path, according to embodiments of this disclosure;

FIG. 8 illustrates a method for monitoring a serving cell where the broadcast beams and the control channel beams use different beam widths, according to embodiments of this disclosure;

FIGS. 9A, 9B, 10A, and 10B illustrate cell monitoring in idle mode or initial network entry, according to embodiments of this disclosure;

DETAILED DESCRIPTION

Figure 1:
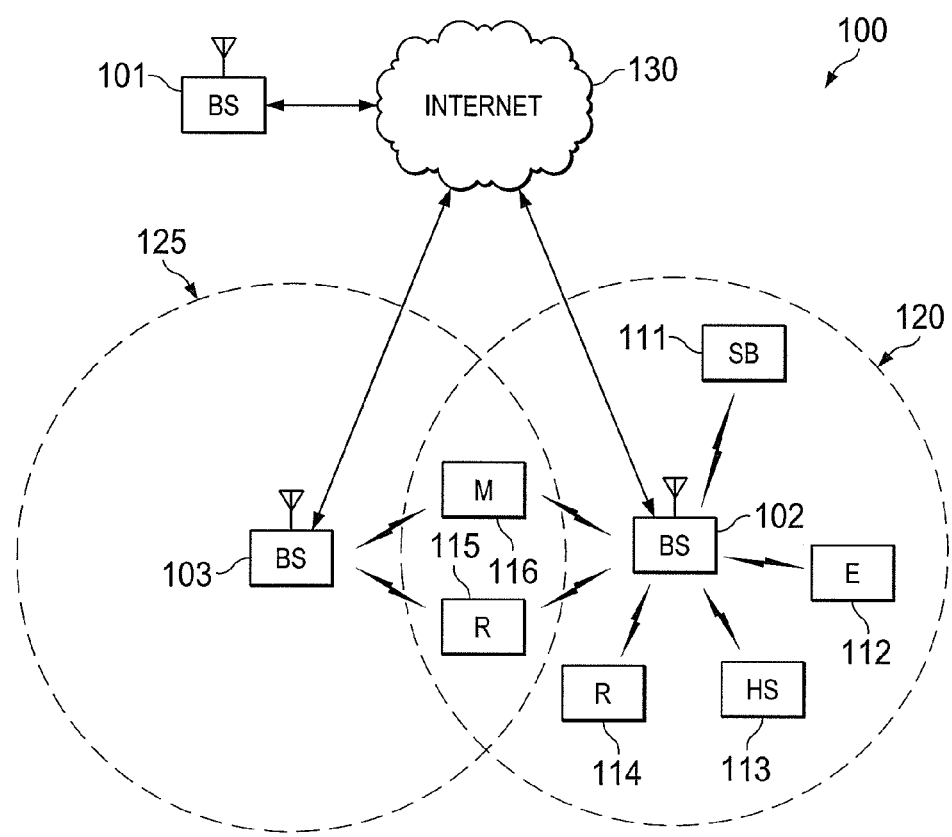
FIG. 1 illustrates a wireless communication network, according to embodiments of this disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) F. Khan and Z. Pi, "MmWave Mobile Broadband (MMB): Unleashing The 3-300 GHz Spectrum", in Proc. Sarnoff Symposium, 2011 (hereinafter "REF1"); Z. Pi and F. Khan, "An Introduction To Millimeter-Wave Mobile Broadband Systems", IEEE Communication Magazine, June 2011 (hereinafter "REF2"); and Z. Pi and F. Khan, "System Design And Network Architecture For A Millimeter-Wave Mobile Broadband (MMB) System", in Proc. Sarnoff Symposium, 2011 (hereinafter "REF3").

The current fourth generation wireless communication systems ("4G systems"), including LTE and Mobile WiMAX, use advanced technologies such as OFDM (Orthogonal Frequency Division Multiplexing), MIMO (Multiple Input Multiple Output), multi-user diversity, link adaptation, and the like, in order to achieve spectral efficiencies which are close to theoretical limits in terms of bps/Hz/cell. Continuous improvements in air-interface performance are being considered by introducing new techniques such as carrier aggregation, higher order MIMO, coordinated Multipoint (CoMP) transmission and relays, and the like. However, it is generally agreed that any further improvements in spectral efficiency will likely be marginal.

When spectral efficiency in terms of bps/Hz/cell cannot be improved significantly, another possibility to increase capacity is to deploy many smaller cells. However, the number of small cells that can be deployed in a geographic area can be limited due to costs involved for acquiring the new site, installing the equipment, provisioning backhaul, and so forth. In theory, to achieve a one-thousand-fold increase in capacity, the number of cells also needs to be increased by the same factor. Another drawback of very small cells is frequent handoffs which increase network signaling overhead and latency. Thus, while small cells may be a component of future wireless networks, the small cells alone are not expected to meet the capacity required to accommodate orders of magnitude increase in mobile data traffic demand in a cost effective manner.

In addition to the new technologies described above, more technologies are being explored to meet the explosive demand of mobile data. REF1, REF2, and REF3 discuss the use Millimeter-wave band (3-300 GHz spectrum) for Mobile Broadband (MMB) applications, with wide area coverage. Key advantages for these frequencies are spectrum availability and small component sizes such as antennas and other radio devices due to short wavelengths. Due to their smaller wave lengths, more millimeter wave antennas can be placed in a relative small area, thus enabling high-gain antenna in a small form factor. Larger bands can be used and higher throughput can be achieved using MMB communications compared to current 4G systems.

In current cellular systems, a mobile station (MS) can detect a base station (BS) using one or more omni-receiving antennas, and transmit information to the BS using one or more omni-transmitting antennas or antennas with a very wide beam. These features permit the MS to easily listen to the downlink control channel from the BS and detect the BS, and also permit the MS to easily send information to the BS during a random access procedure.

However, in certain newer cellular system's with directional antennas or antenna arrays, such as a MMB cellular system, one of the challenges is how a mobile station can detect base stations and establish communication to get into the network. One reason that makes it a challenge is that a base station can send its downlink control channel (e.g., a synchronization channel) or broadcast channel in directional beams, while the mobile station may receive and send information in directional beams. This makes it more difficult for a mobile station to discover base stations and try to randomly access the network. In existing prior art (see, e.g., REF1, REF2 and REF3), there is no specific technology to solve the problem of how to efficiently and reliably support a mobile station's random access to the network in a system with directional antennas or antenna arrays.

This disclosure describes methods and apparatus to support cell monitoring in millimeter wave wideband communications. Although embodiments of this disclosure are described in the context of communication with millimeter waves, the disclosed embodiments are also applicable in other communication mediums, e.g., radio waves with frequency of 3 GHz-30 GHz that exhibit properties similar to millimeter waves. In some cases, the disclosed embodiments are also applicable to electromagnetic waves with terahertz frequencies, infrared, visible light, and other optical media. For illustrative purposes, the terms "cellular band" and "millimeter wave band" are used herein, where "cellular band" refers to frequencies of approximately a few hundred megahertz to a few gigahertz, and "millimeter wave band" refers to frequencies of approximately a few tens of gigahertz to a few hundred gigahertz. One difference between the two is that the radio waves in cellular bands have less propagation loss and can provide superior coverage, but may require large antennas. On the other hand, radio waves in millimeter wave bands usually exhibit higher propagation loss but lend themselves well to high-gain antennas or antenna array designs in a small form factor.

As described above, millimeter waves typically refer to radio waves with wavelengths in the range of 1 mm-100 mm, which corresponds to a radio frequency of 3 GHz-300 GHz. As defined by ITU (International Telecommunications Union), these frequencies are also referred to as the EHF (Extremely High Frequency) band. These radio waves exhibit unique propagation characteristics. For example, compared with lower frequency radio waves, millimeter waves are often associated with higher propagation loss, have poorer ability to penetrate objects (e.g., buildings, walls, and foliage), and are more susceptible to atmosphere absorption, deflection and diffraction due to particles (e.g., rain drops) in the air. However, due to their smaller wavelengths, more millimeter wave antennas can be placed in a relatively small area, thus enabling high-gain antennas in a small form factor. In addition, due to the aforementioned perceived disadvantages, these radio waves have been less utilized than the lower frequency radio waves. Accordingly, spectrum in this band may be acquired at a lower cost.

The ITU defines frequencies in 3 GHz-30 GHz as SHF (Super High Frequency). The frequencies in the SHF band exhibit behavior similar to radio waves in the EHF band (i.e., millimeter waves), such as large propagation loss and the possibility of implementing high-gain antennas in small form factors.

Vast amounts of spectrum are available in the millimeter wave band. The millimeter wave band has been used, for example, in short range (within 10 meters) communications. However, the existing technologies in millimeter wave band are not optimized for commercial mobile communication having a wider coverage, so there is currently no significant commercial cellular system in millimeter wave band. Throughout this disclosure, mobile broadband communication systems deployed in 3-300 GHz frequencies will be referred to as millimeter-wave mobile broadband (MMB).

In accordance with some embodiments of this disclosure, the existing technologies for mobile communication are leveraged while utilizing the millimeter wave channel as additional spectrum for data communication. In such a system, communication stations (including different types of mobile stations, base stations, and relay stations) communicate using both cellular bands and millimeter wave bands. The cellular bands may be in the frequency of approximately a few hundred megahertz to a few gigahertz. Compared with millimeter waves, the radio waves in these frequencies may exhibit less propagation loss, can better penetrate obstacles, and are less sensitive to non-line-of-sight (NLOS) communication links or other impairments such as absorption by oxygen, rain, and other particles in the air. Therefore, it may be advantageous to transmit certain important control channel signals via the cellular radio frequencies, while utilizing the millimeter waves for high data rate communication.

In accordance with some embodiments of this disclosure, both stand-alone mobile communications and control/data communications may occur in MMB. The communications in MMB may coexist with current cellular systems (e.g., 4G, 3G, and the like). A mobile station can hand over to an existing 3G or 4G cellular system in situations where the mobile station is in a coverage "hole" in the MMB system, or the signal strength from the base stations in MMB is not strong enough. Base stations in MMB can include different sizes with an overlay hierarchical network structure, where small cells can be overlaid by large cells.

The embodiments disclosed herein primarily describe communication between base stations and mobile stations (e.g., base station to mobile station transmission). Those skilled in the art will recognize that the disclosed embodiments are also applicable for communications between base stations (e.g., base station to base station transmission), and for communications between mobile stations (e.g., mobile station to mobile station communication). The embodiments disclosed herein are applicable for communication systems with large number of antennas, such as systems in MMB, RF band, and the like.

FIG. 1 illustrates a wireless communication network, according to embodiments of this disclosure. The embodiment of wireless communication network 100 illustrated in FIG. 1 is for illustration only. Other embodiments of the wireless communication network 100 could be used without departing from the scope of this disclosure.

In the illustrated embodiment, the wireless communication network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (also referred to herein as mobile stations) within coverage area 120 of base station 102. Throughout this disclosure, the term mobile station (MS) is interchangeable with the term subscriber station. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Each base station 101-103 can have a globally unique base station identifier (BSID). A BSID is often a MAC (media access control) ID. Each base station 101-103 can have multiple cells (e.g., one sector can be one cell), each with a physical cell identifier, or a preamble sequence, which is often carried in the synchronization channel.

While only six subscriber stations are depicted in FIG. 1, it is understood that the wireless communication network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. For example, subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

FIG. 2A is a high-level diagram of an orthogonal frequency division multiple access (OFDMA) or millimeter wave transmit path, according to embodiments of this disclosure. FIG. 2B is a high-level diagram of an OFDMA or millimeter wave receive path, according to embodiments of this disclosure. In FIGS. 2A and 2B, the transmit path 200 may be implemented, e.g., in base station (BS) 102 and the receive path 250 may be implemented, e.g., in a subscriber station, such as subscriber station 116 of FIG. 1. It will be understood, however, that the receive path 250 could be implemented in a base station (e.g. base station 102 of FIG. 1) and the transmit path 200 could be implemented in a subscriber station. All or part of the transmit path 200 and the receive path 250 may comprise, or be comprised of, one or more processors.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

In one embodiment of this disclosure, a base station (BS) can have one or multiple cells, and each cell can have one or multiple antenna arrays, where each array within a cell can have different frame structures, e.g., different uplink and downlink ratios in a time division duplex (TDD) system. Multiple TX/RX (transmitting/receiving) chains can be applied in one array, or in one cell. One or multiple antenna arrays in a cell can have the same downlink control channel (e.g., synchronization channel, physical broadcast channel, and the like) transmission, while the other channels (e.g., data channel) can be transmitted in the frame structure specific to each antenna array.

The base station can use one or more antennas or antenna arrays to carry out beam forming. Antenna arrays can form beams having different widths (e.g., wide beam, narrow beam, etc.). Downlink control channel information, broadcast signals and messages, and broadcast data channels and control channels can be transmitted in wide beams. A wide beam may include a single wide beam transmitted at one time, or a sweep of narrow beams at sequential times. Multicast and unicast data and control signals and messages can be transmitted in narrow beams.

Identifiers of cells can be carried in the synchronization channel. Identifiers of arrays, beams, and the like, can be implicitly or explicitly carried in the downlink control channels (e.g., synchronization channel, physical broadcast channel, and the like). These channels can be sent over wide beams. By acquiring these channels, the mobile station (MS) can detect the identifiers.

A mobile station (MS) can also use one or more antennas or antenna arrays to carry out beam forming. As in BS antenna arrays, antenna arrays at the MS can form beams with different widths (e.g., wide beam, narrow beam, etc.). Broadcast signals and messages, and broadcast data channels and control channels can be transmitted in wide beams. Multicast and unicast data and control signals and messages can be transmitted in narrow beams.

Figure 3A:
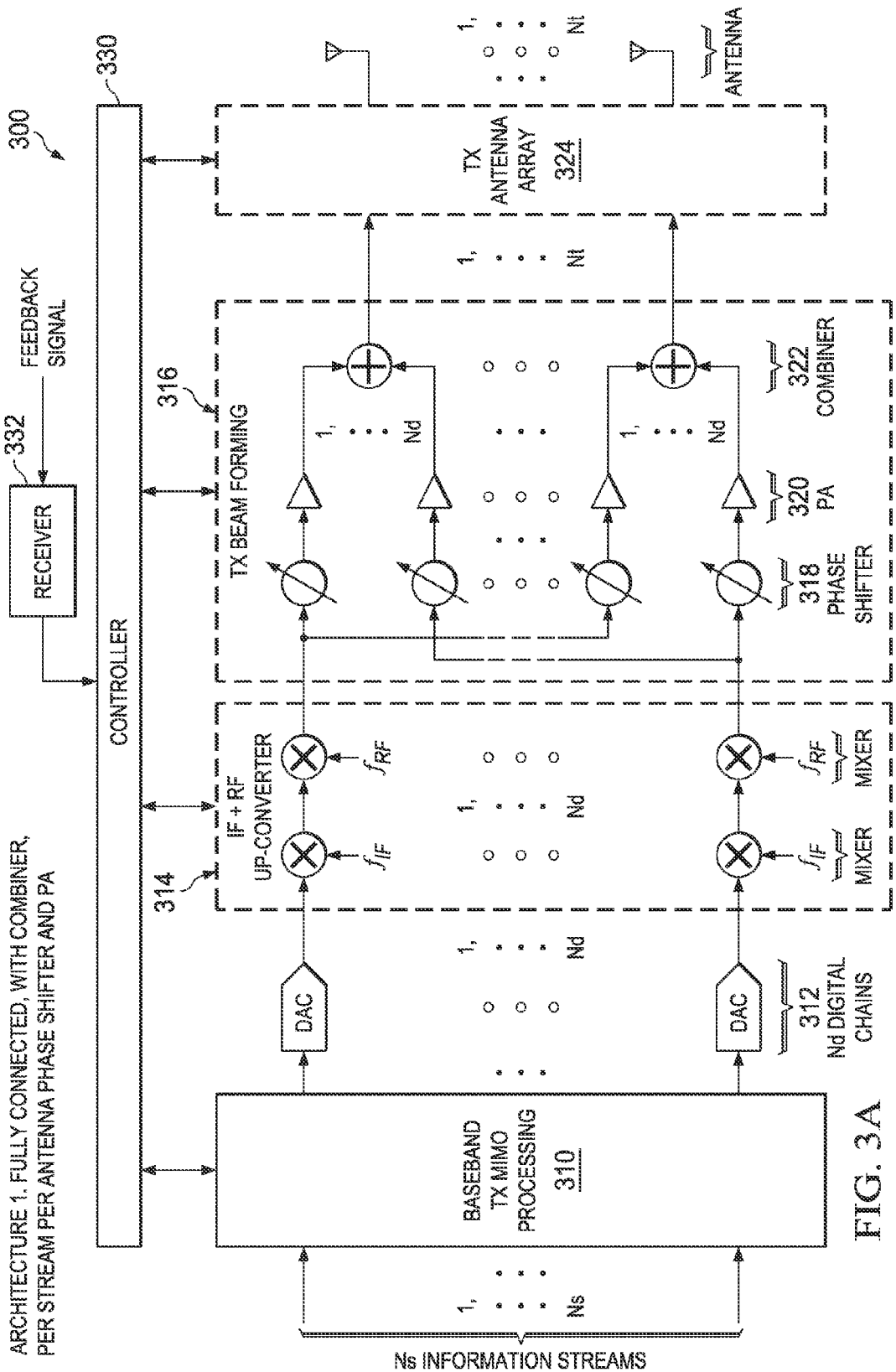
FIG. 3A illustrates a transmit path for multiple input multiple output (MIMO) baseband processing and analog beam forming with a large number of antennas, according to embodiments of this disclosure.

FIG. 3A illustrates a transmit path for multiple input multiple output (MIMO) baseband processing and analog beam forming with a large number of antennas, according to embodiments of this disclosure. The transmit path 300 includes a beam forming architecture in which all of the signals output from baseband processing are fully connected to all the phase shifters and power amplifiers (PAs) of the antenna array.

As shown in FIG. 3A, Ns information streams are processed by a baseband processor (not shown), and input to the baseband TX MIMO processing block 310. After the baseband TX MIMO processing, the information streams are converted at a digital and analog converter (DAC) 312, and further processed by an interim frequency (IF) and radio frequency (RF) up-converter 314, which converts the baseband signal to the signal in RF carrier band. In some embodiments, one information stream can be split to I (in-phase) and Q (quadrature) signals for modulation. After the IF and RF up-converter 314, the signals are input to a TX beam forming module 316.

FIG. 3A shows one possible architecture for the beam forming module 316, where the signals are fully connected to all the phase shifters and power amplifiers (PAs) of the transmit antennas. Each of the signals from the IF and RF up-converter 314 can go through one phase shifter 318 and one PA 320, and via a combiner 322, all the signals can be combined to contribute to one of the antennas of the TX antenna array 324. In FIG. 3A, there are Nt transmit antennas in the TX array 324. Each antenna transmits the signal over the air. A controller 330 can interact with the TX modules including the baseband processor, IF and RF up-converter 314, TX beam forming module 316, and TX antenna array module 324. A receiver module 332 can receive feedback signals and the feedback signals can be input to the controller 330. The controller 330 can process the feedback signal and adjust the TX modules.

Figure 3B:
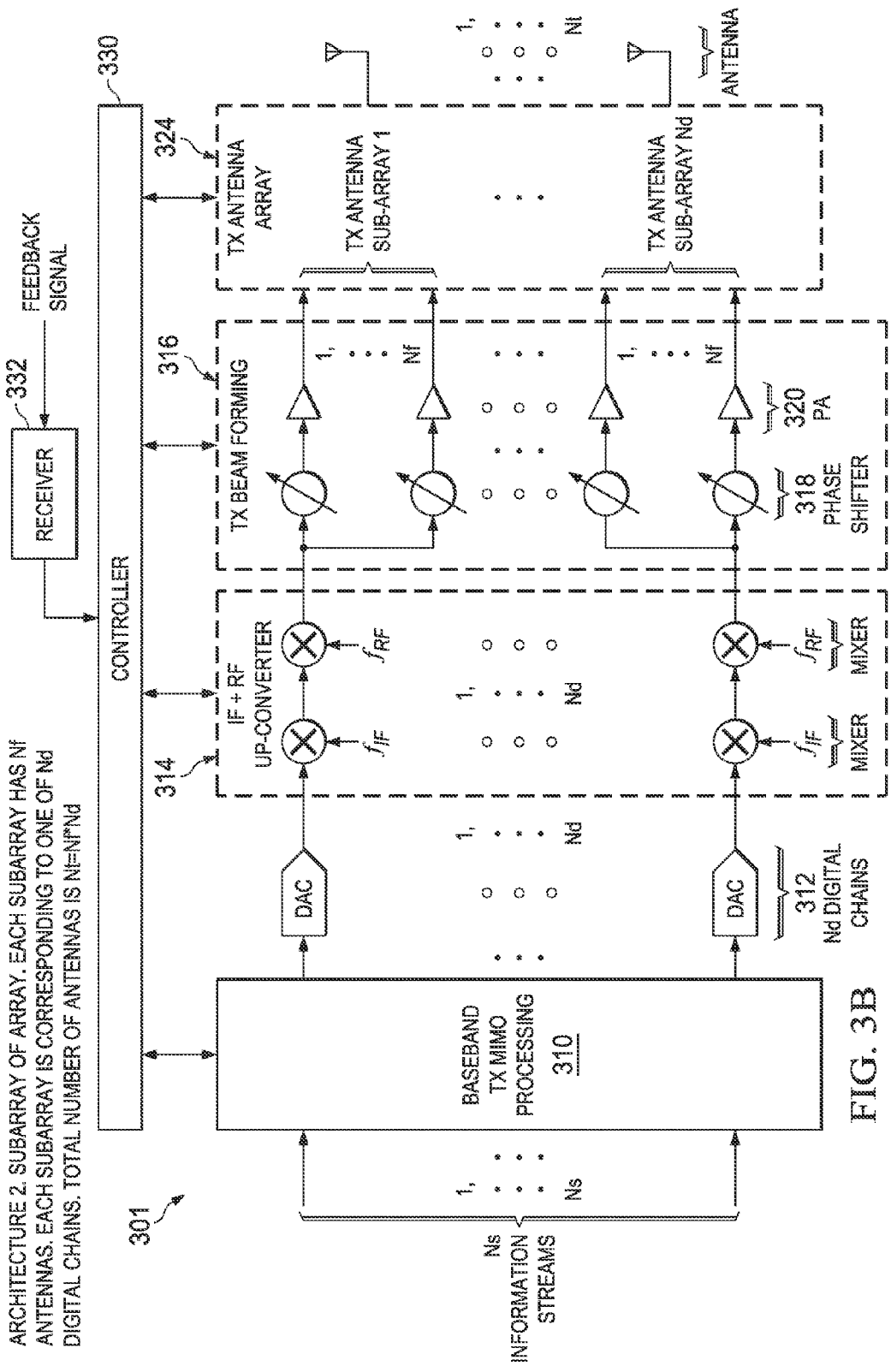
FIG. 3B illustrates another transmit path for MIMO baseband processing and analog beam forming with a large number of antennas, according to embodiments of this disclosure.

FIG. 3B illustrates another transmit path for MIMO baseband processing and analog beam forming with a large number of antennas, according to embodiments of this disclosure. The transmit path 301 includes a beam forming architecture in which a signal output from baseband processing is connected to the phase shifters and power amplifiers (PAs) of a sub-array of the antenna array. The transmit path 301 is similar to the transmit path 300 of FIG. 3A, except for differences in the beam forming module 316.

As shown in FIG. 3B, the signal from the baseband is processed through the IF and RF up-converter 314, and is input to the phase shifters 318 and power amplifiers 320 of a sub-array of the antenna array 324, where the sub-array has Nf antennas. For the Nd signals from baseband processing (e.g., the output of the MIMO processing), if each signal goes to a sub-array with Nf antennas, the total number of transmitting antennas Nt should be Nd*Nf. The transmit path 301 includes an equal number of antennas for each sub-array. However, the disclosure is not limited thereto. Rather, the number of antennas for each sub-array need not be equal across all sub-arrays.

The transmit path 301 includes one output signal from the MIMO processing as the input to the RF processing with one sub-array of antennas. However, this disclosure is not limited thereto. Rather, one or multiple signals out of the Nd signals from base band processing (e.g., the output of the MIMO processing) can be the inputs to one of the sub-arrays. When multiple output signals from the MIMO processing are as the inputs to one of the sub-arrays, each of the multiple output signals from the MIMO processing can be connected to part of or all of the antennas of the sub-array. For example, the RF and IF signal processing with each of the sub-array of antennas can be the same as the processing with the array of antennas as in FIG. 3A, or any type of the RF and IF signal processing with an array of antennas. The process related to one sub-array of the antennas may be referred to as one "RF chain".

Figure 3C:
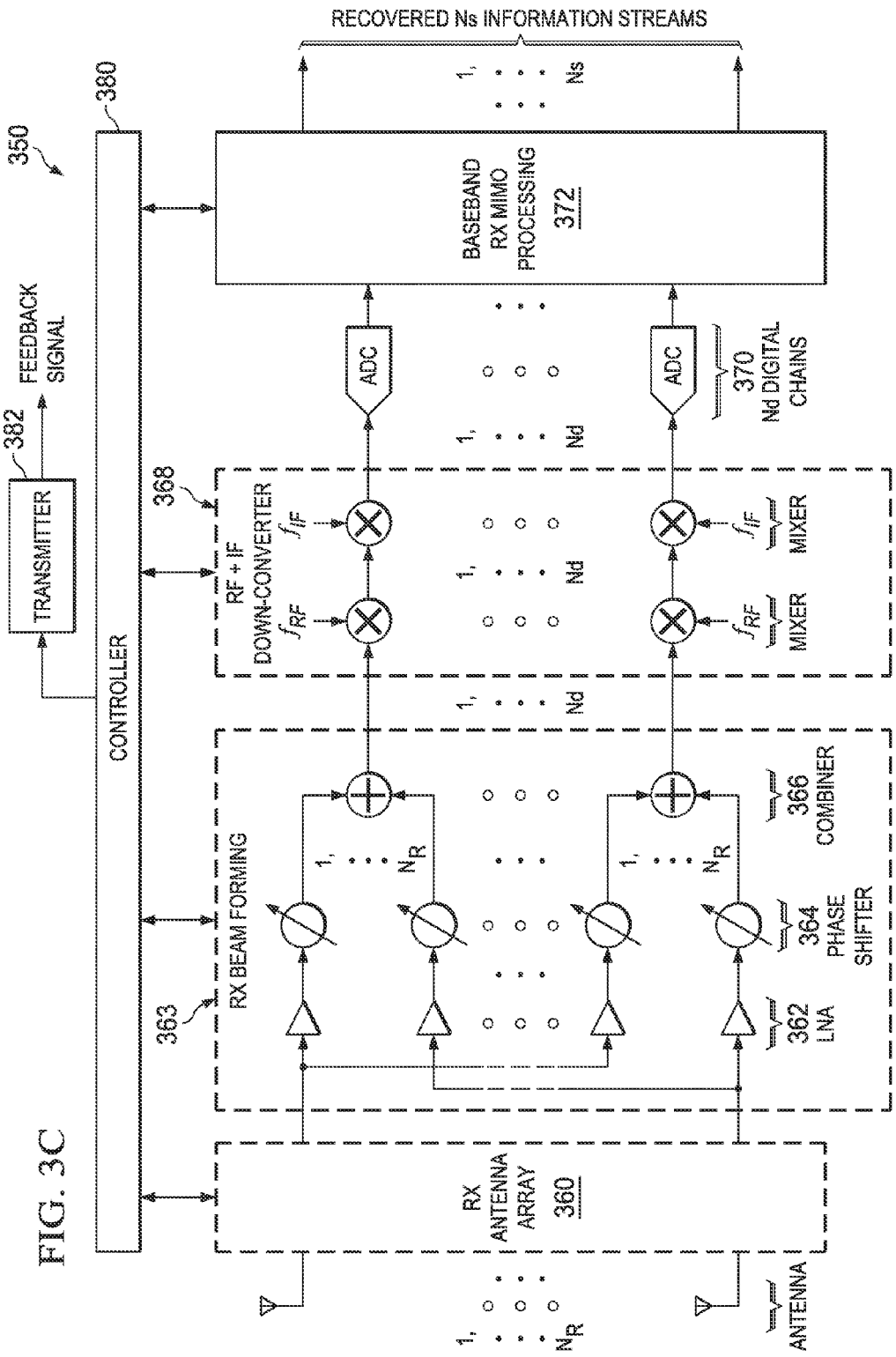
FIG. 3C illustrates a receive path for MIMO baseband processing and analog beam forming with a large number of antennas, according to embodiments of this disclosure.

FIG. 3C illustrates a receive path for MIMO baseband processing and analog beam forming with a large number of antennas, according to embodiments of this disclosure. The receive path 350 includes a beam forming architecture in which all of the signals received at the RX antennas are processed through an amplifier (e.g., a low noise amplifier (LNA)) and a phase shifter. The signals are then combined to form an analog stream that can be further converted to the baseband signal and processed in a baseband.

As shown in FIG. 3C, NR receive antennas 360 receive the signals transmitted by the transmit antennas over the air. The signals from the RX antennas are processed through the LNAs 362 and the phase shifters 364. The signals are then combined at a combiner 366 to form an analog stream. In total, Nd analog streams can be formed. Each analog stream can be further converted to the baseband signal via a RF and IF down-converter 368 and an analog to digital converter (ADC) 370. The converted digital signals can be processed in a baseband RX MIMO processing module 372 and other baseband processing, to obtain the recovered NS information streams. A controller 380 can interact with the RX modules including baseband processor, RF and IF down-converter 368, RX beam forming module 363, and RX antenna array module 360. The controller 380 can send signals to a transmitter module 382, which can send a feedback signal. The controller 380 can adjust the RX modules and determine and form the feedback signal.

Figure 3D:
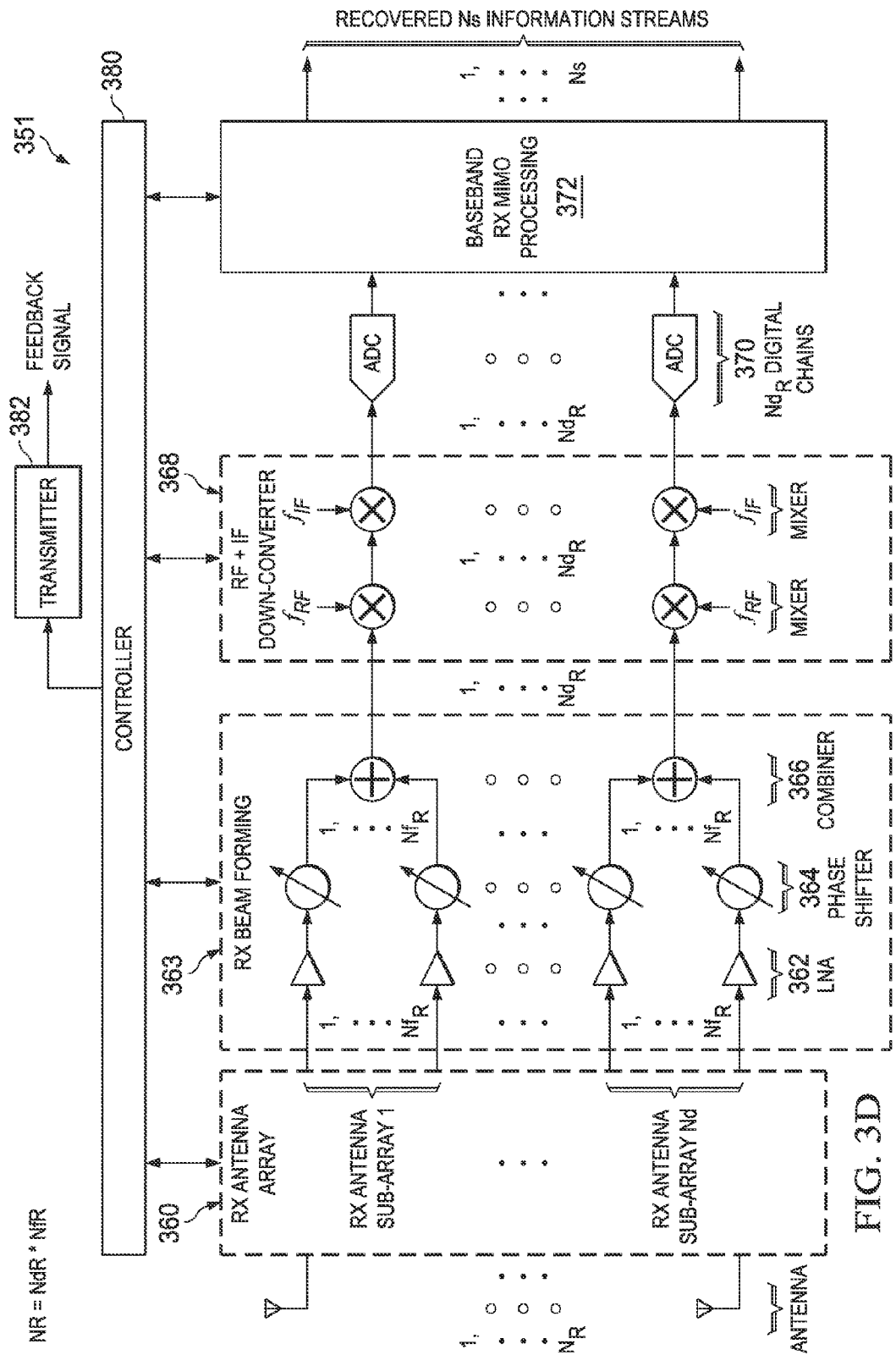
FIG. 3D illustrates another receive path for MIMO baseband processing and analog beam forming with a large number of antennas, according to embodiments of this disclosure.

FIG. 3D illustrates another receive path for MIMO baseband processing and analog beam forming with a large number of antennas, according to embodiments of this disclosure. The receive path 351 includes a beam forming architecture in which the signals received by a sub-array of the antenna array can be processed by amplifiers and phase shifters, to form an analog stream which can be converted and processed in the baseband. The receive path 351 is similar to the receive path 350 of FIG. 3C, except for differences in the beam forming module 363.

As shown in FIG. 3D, the signals received by NfR antennas of a sub-array of the antenna array 360 are processed by the LNAs 362 and phase shifters 364, and are combined at combiners 366 to form an analog stream. There can be NdR sub-arrays (NdR=NR/NFR), with each sub-array forming one analog stream. Hence, in total, NdR analog streams can be formed. Each analog stream can be converted to the baseband signal via a RF and IF down-converter 368 and an ADC 370. The NdR digital signals are processed in the baseband module 372 to recover the Ns information streams. The receive path 351 includes an equal number of antennas for each sub-array. However, the disclosure is not limited thereto. Rather, the number of antennas for each sub-array need not be equal across all sub-arrays.

The receive path 351 includes one output signal from the RF processing with one sub-array of antennas, as one of the inputs to the baseband processing. However, this disclosure is not limited thereto. Rather, one or multiple output signals from the RF processing with one sub-array of antennas, can be the inputs to the baseband processing. When multiple output signals from the RF processing with one sub-array of antennas are the inputs, each of the multiple output signals from the RF processing with one sub-array of antennas, can be connected to part of or all of the antennas of the said sub-array. For example, the RF and IF signal processing with each of the sub-array of antennas can be the same as the processing with the array of antennas as in FIG. 3C, or any type of the RF and IF signal processing with an array of antennas. The process related to one sub-array of the antennas can be referred to as one "RF chain".

In other embodiments, there can be other transmit and receive paths which are similar to the paths in FIGS. 3A through 3D, but with different beam forming structures. For example, the power amplifier 320 can be after the combiner 322, so the number of amplifiers can be reduced.

Figure 4:
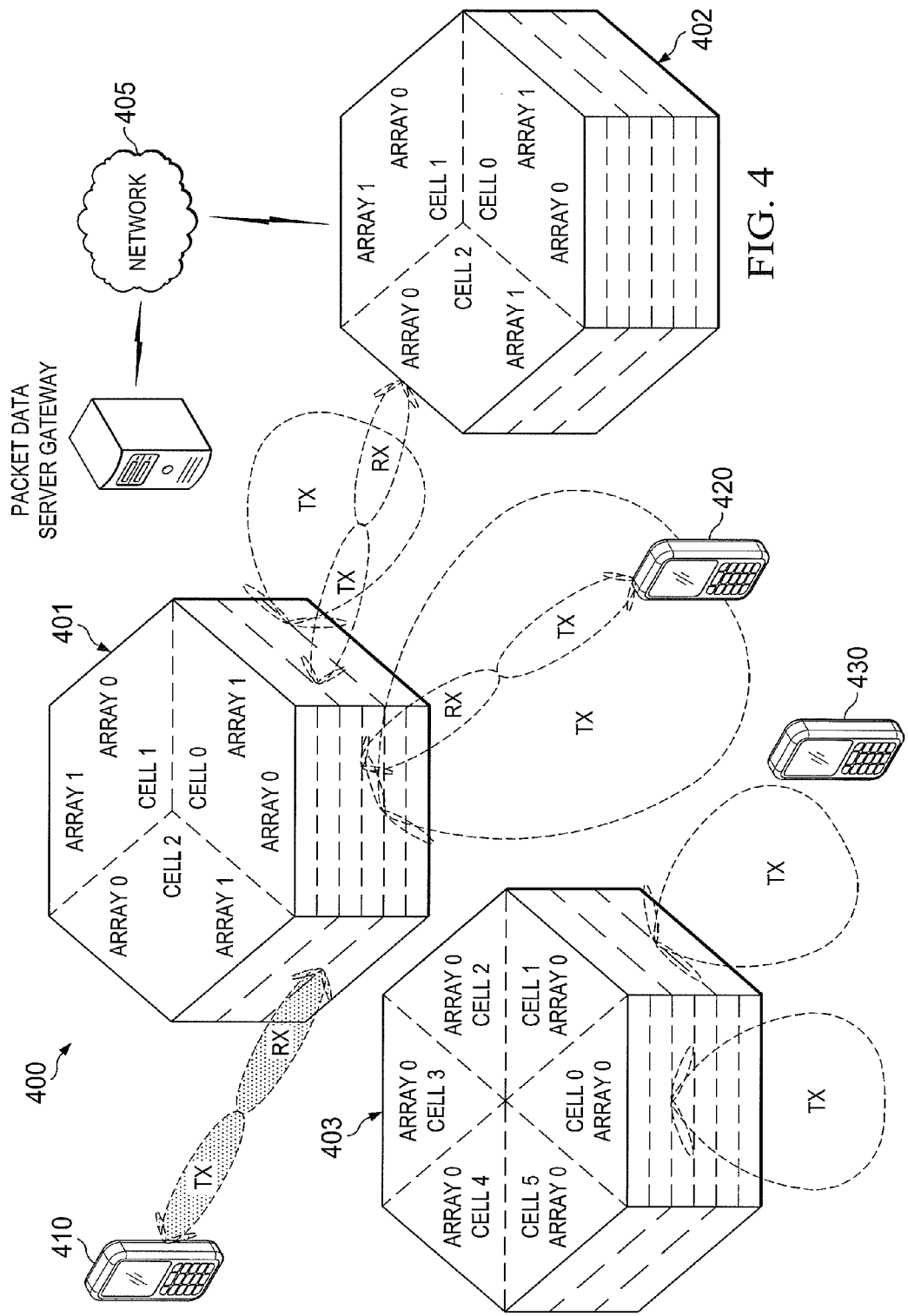
FIG. 4 illustrates a wireless communication system using antenna arrays, according to an embodiment of this disclosure.

FIG. 4 illustrates a wireless communication system using antenna arrays, according to an embodiment of this disclosure. The embodiment of wireless communication system 400 illustrated in FIG. 4 is for illustration only. Other embodiments of the wireless communication system 400 could be used without departing from the scope of this disclosure.

As shown in FIG. 4, system 400 includes base stations 401-403 and mobile stations 410-430. Base stations 401-403 may represent one or more of base stations 101-103 of FIG. 1. Likewise, mobile stations 410-430 may represent one or more of subscriber stations 111-116 of FIG. 1.

BS 401 includes three cells, cell 0, cell 1, and cell 2. Each cell includes two arrays, array 0 and array 1. In cell 0 of BS 401, antenna array 0 and array 1 may transmit the same downlink control channels on a wide beam. However, array 0 can have a different frame structure from array 1. For example, array 0 may receive uplink unicast communication from MS 420, while array 1 can transmit downlink backhaul communication with cell 2 array 0 of BS 402. BS 402 includes a wired backhaul connecting to one or more backhaul networks. A synchronization channel (SCH) and broadcast channel (BCH) can also be transmitted over multiple beams with a beam width not as wide as the widest transmission beam from BS 401 shown in FIG. 4. Each of these multiple beams for the SCH or BCH may have a beam width wider than beams for unicast data communication, which can be for communication between a base station and a single mobile station.

Throughout the disclosure, the transmit beams can be formed by a transmit path such as shown in FIGS. 3A and 3B. Likewise, the receive beams can be formed by a receive path such as shown in FIGS. 3C and 3D.

One or more of the wireless links illustrated in FIG. 4 may be broken due to a LOS blockage (e.g., objects such as people or cars move into the LOS) or a NLOS may not have rays strong enough to maintain the communication. Even if a MS is close to a BS and the MS only moves a short distance, the link may be broken. In such an event, the MS may need to switch links if the current link cannot be recovered. A MS may need to switch links even if the MS is not at the cell edge.

If each antenna in the arrays is not positioned at a high elevation, then TX or RX beams substantially covering a sphere may be used. For example, if each beam is shaped like a pencil, then at each sampling point of a 360-degree circle of azimuth search, a 180-degree elevation search may be needed. Alternatively, if each antenna is positioned at a high elevation, then at each sampling point of a 360-degree circle of azimuth search, a less than 180-degree elevation search may be sufficient.

Figure 5:
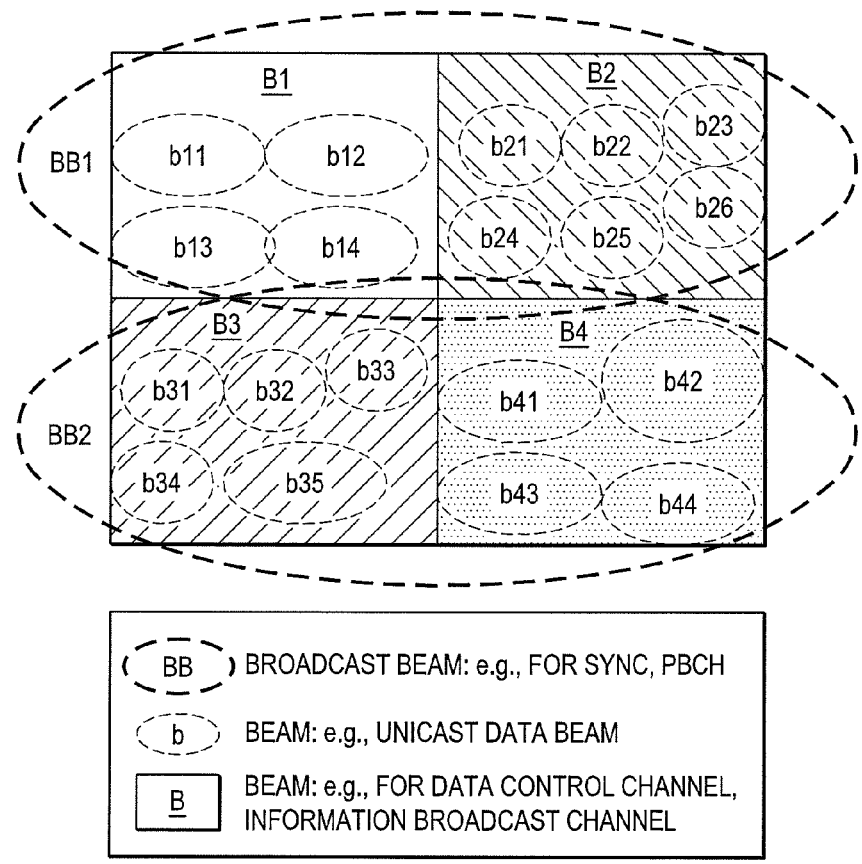
FIG. 5 illustrates an example of different beams having different shapes for different purposes in a sector or a cell, according to one embodiment of this disclosure.

FIG. 5 illustrates an example of different beams having different shapes and different beam widths for different purposes in a sector or a cell, according to one embodiment of this disclosure. The embodiment illustrated in FIG. 5 is for illustration only. Other embodiments could be used without departing from the scope of this disclosure. The sector/cell shown in FIG. 5 may represent one or more of the base station cells depicted in FIG. 4. Throughout the disclosure, the beams (including TX beams and RX beams) can have various beam widths or various shapes, including regular or irregular shapes, not limited by those in the figures.

In a sector or a cell, one or multiple arrays with one or multiple RF chains can generate beams in different shape for different purposes. In FIG. 5, the vertical dimension can represent elevation, and the horizontal dimension can represent azimuth. As shown in FIG. 5, wide beams BB1, BB2 (also called broadcast beams, or "BB") may be configured for synchronization, physical broadcast channel, or a physical configuration indication channel that indicates where the physical data control channel is located, etc. The wide beams BB1, BB2 can carry the same information for the cell.

Although two wide beams BB1, BB2 are illustrated in FIG. 5, a cell may be configured for one or multiple BBs. When there are multiple BBs in a cell, the BBs can be differentiated by implicit or explicit identifier, and the identifier can be used by the MS to monitor and report BBs. The BB beams can be swept and repeated. The repetition of the information on BB beams may depend on the MS's number of RX beams to receive the BB beam. That is, in one embodiment, the number of repetitions of the information on BB beams may be no less than the number of RX beams at the MS to receive the BB beam.

Wide control channel beams B1-B4 (collectively, "B beams") can be used for control channels. Control channel beams B1-B4 may or may not use the same beam width as wide beams BB1, BB2. Beams B1-B4 may or may not use the same reference signals as wide beams BB1, BB2 for the MS to measure and monitor. Wide beams B1-B4 are particularly useful for a broadcast or multicast to a group of MSs, as well as control information for certain MS, such as MS-specific control information, e.g., the resource allocation for an MS.

Although four control channel beams B1-B4 are illustrated in FIG. 5, a cell may be configured for one or multiple B beams. When there are multiple B beams in a cell, the B beams can be differentiated by implicit or explicit identifier, and the identifier can be used by the MS to monitor and report the B beams. The B beams can be swept and repeated. The repetition of the information on B beams can be depending on the MS's number of RX beams to receive the B beam. That is, in one embodiment, the number of repetitions of the information on B beams may be no less than the number of RX beams at the MS to receive the B beams. An MS may or may not search for beams B1-B4 by using the information on beams BB1, BB2.

Beams b11-b44 (collectively, "b beams") may be used for data communication. A b beam may have an adaptive beam width. For some MSs (e.g., a MS with low speed), a narrower beam can be used, and for some MSs, a wider beam can be used. Reference signals can be carried by b beams. Although nineteen b beams are illustrated in FIG. 5, a cell may be configured for one or multiple b beams. When there are multiple b beams in a cell, the b beams can be differentiated by implicit or explicit identifier, and the identifier can be used by the MS to monitor and report the b beams. The b beams can be repeated. The repetition of the information on the b beams may depend on the MS's number of RX beams to receive the b beam. That is, in one embodiment, the number of repetitions of the information on b beams may be no less than the number of RX beams at the MS to receive the b beams. A TX beam b can be locked with a RX beam after the MS monitors the beams. If the data information is sent over a locked RX beam, the repetition of the information on the b beam may not be needed.

Figure 6A:
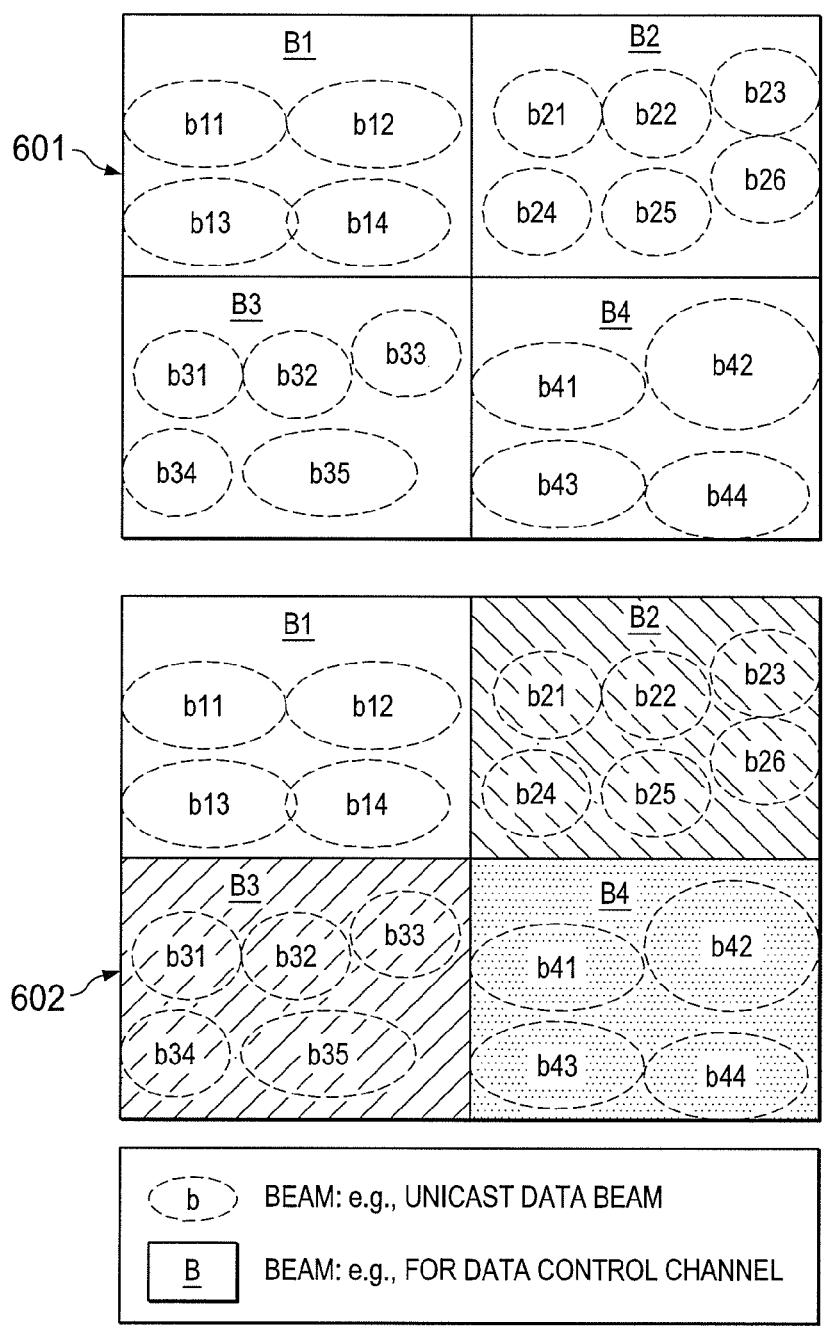
FIG. 6A illustrates the use of beams to carry the same or different information to a mobile station or base station in a cell, according to embodiments of this disclosure.

FIG. 6A illustrates the use of beams to carry the same or different information to a mobile station or base station in a cell, according to embodiments of this disclosure. The embodiments illustrated in FIG. 6A are for illustration only. Other embodiments could be used without departing from the scope of this disclosure.

As shown in FIG. 6A, beams B1-B4 (collectively, "B beams") may be configured for control channels, such as control information broadcast/multicast to a group of devices such as MSs and BSs, as well as control information for certain devices (e.g., MS- or BS-specific control information, such as a resource allocation for a MS). The control channel can be, e.g., a physical downlink control channel (PDCCH), which provides common information regarding the resource allocation (e.g., resource blocks, power control, etc.), resource allocation information of the system information blocks (SIBs) to all the MSs in the cell, and MS-specific information about the resource allocation to a certain MS.

The downlink control information (DCI) can be sent in a format which may include both the MS-specific information and the common information for all MSs. The DCI carries downlink or uplink scheduling information as well as uplink power control commands. A dedicated control approach is used for the physical downlink control channel (PDCCH) to carry the DCI.

There can be multiple downlink control information (DCI) formats, where some formats can be only for MS specific DCI, some formats can be only for MS common information, and some formats can be for both MS specific and MS common information. One or more PDCCHs can be transmitted in a subframe possibly using one or more transmission formats of DCI. A control channel element (CCE) consisting of some physical resources can be the minimum unit of transmission for PDCCH. A PDCCH can include one or more CCEs. It is noted that DCI and DCI format are for communication information at the logical level, while PDCCH and CCE are at the physical level. PDCCH is the physical channel carrying the DCI which is in DCI format, while PDCCH itself can have its own format which may have no explicit relationship with DCI format.

An MS can monitor a set of PDCCH candidates in terms of search spaces, where the search space can be defined by a set of PDCCH candidates and such definition can use a formula or mapping method that can be predefined to the MS. The formula or mapping method can be a mapping from system parameters (such as the MS's MAC ID, radio network temporary identifier (RNTI), aggregation layer index, the number of the PDCCH candidates to monitor in the given search space, number of the CCEs for the given search space, and the like) to the indices of the CCEs corresponding to a PDCCH candidate of the search space. The search space can have two types, MS-specific space and common space. MS-specific control information can be in the PDCCH in the MS-specific search space, while the common information can be in the PDCCH in the common search space. The common search spaces and MS-specific search spaces may overlap.

An MS can monitor the common search space and MS-specific search space, and perform blind decoding to decode PDCCHs. In some cases, the PDCCH may only have a common search space or only have a MS-specific search space, and MS may only need to monitor one type of search spaces correspondingly. A cyclic redundancy code (CRC) is attached to PDCCH information and the MAC ID, also referred as RNTI (radio network temporary identifier), is implicitly encoded in the CRC. To encode the MAC ID in the CRC, one example can be to scramble the MAC ID and then XOR with the CRC, another example can be to map the MAC ID to the CRC by using hash function and the like, and yet another example can be to generate the CRC by taking MAC ID as a parameter for the CRC generation, and there can be other similar examples.

The PDCCHs in common search spaces can use a predefined CRC or reserved CRC, and this CRC can be common to many MSs. The reserved CRC may correspond to a predefined or reserved MAC ID or common MAC ID. One or multiple reserved CRCs can be used for one or multiple PDCCHs in the common search spaces. An MS can use the reserved or predefined CRC or the reserved or predefined MAC ID to blind decode the PDCCHs in the common search spaces. For the PDCCHs in the MS-specific search spaces, for the information specific to an MS, it uses CRC encoded with the said MS's MAC ID. An example is to scramble the MS's MAC ID with the CRC by XOR operation. When the MS blind decode the PDCCH, it uses its own MAC ID to XOR with the derived CRC to blind decode.

As a first example, by using a first specific scrambling code that can be XOR-operated with a cyclic redundancy code (CRC) on the PDCCH, the PDCCH can carry common information to all MSs, where the common information includes the resource allocation information of the system information blocks (SIBs).

As a second example, by using a second specific scrambling code that can be XOR-operated with a CRC on the PDCCH, the PDCCH can carry common information to all MSs, where the common information includes the common control signaling to all UEs such as the resource allocation, resource block assignment and hopping resource allocation, modulation and coding scheme, redundancy version, power control information, power control for scheduled uplink control or data channel, channel quality indicator request, new data indicator, information for scheduling uplink transmissions on uplink data channel, and the like. As a third example, by using a MS identifier as a scrambling code which can be XOR-operated with a CRC on the PDCCH, the PDCCH can carry information specific to the MS associated the MS identifier, where the information includes the resource allocation information specific to the MS, power control information, power control command for the uplink control or data channel, hybrid automatic repeat request (HARM) process number, precoding information, modulation and coding scheme, redundancy version, new data indicator, information for scheduling uplink transmissions on uplink data channel, and the like.

The MS can use blind decoding to decode the PDCCH when a PDCCH is received. Using an XOR operation, the MS can detect which scrambling code was used to scramble the CRC, and the MS can determine the purpose of the received PDCCH based on the decoded scrambling code. For example, the MS can determine whether the PDCCH is for resource allocation of SIBs, for the common signaling, or a resource allocation specific to itself.

A PDCCH-common channel can be a PDCCH that carries one or multiple types of information common to the MSs. For example, if a PDCCH has a format for carrying one type of information, a PDCCH-common channel can be the PDCCH described in the first or second example above. If a PDCCH has a format for carrying multiple types of information common to the MSs, the PDCCH-common channel can be a PDCCH carrying both the information of resource allocation of SIBs and common signaling, for example.

A PDCCH-MS-specific channel can be a PDCCH that has a format for carrying information specific to a certain MS. A PDCCH-MS-specific channel may also be a PDCCH carrying information specific to a certain MS, and information which is common to all MSs.

In one embodiment, all of the B beams in a cell may send the same information to all MSs in the cell. For example, as shown in cell 601 in FIG. 6A, the PDCCH can be sent using all B-beams B1-B4, where the PDCCH includes information common to all MSs, or specific to one or more individual MSs. Beams B1-B4 may explicitly or implicitly carry identifiers for the MS to identify them, for monitoring and reporting purposes. Alternatively, the B beams may not carry any identifier information, in which case the MS may not be able to identify them. Such B beams have the effect of a wide beam which has a coverage of all the B beams in the cell.

In another embodiment, the B beams in a cell may send different information to MSs in the cell. For example, as shown in cell 602 in FIG. 6A, the PDCCH-common channel may use all B-beams B1-B4, while a PDCCH-MS-specific channel uses a particular B beam B1-B4 that covers the specific MS within its coverage. Beams B1-B4 may explicitly or implicitly carry identifiers for the MS to identify them, for monitoring and reporting purposes. Each beam B1-B4 may send information related to the MSs in its coverage, e.g., the resource allocation (e.g., resource block, power control, and the like) for the data beams to the MSs in its coverage.

A combination of the above is also applicable. For example, the control information can have two categories. For example, one category includes common information which is common to all MSs in the cell, and the other category includes the information only related to a group of MSs within each B beam's coverage. The common information for the entire group of MSs in the cell can be sent over all B beams, while the information only related to the MSs in B beam coverage can be sent over a particular B beam.

Figure 6B:
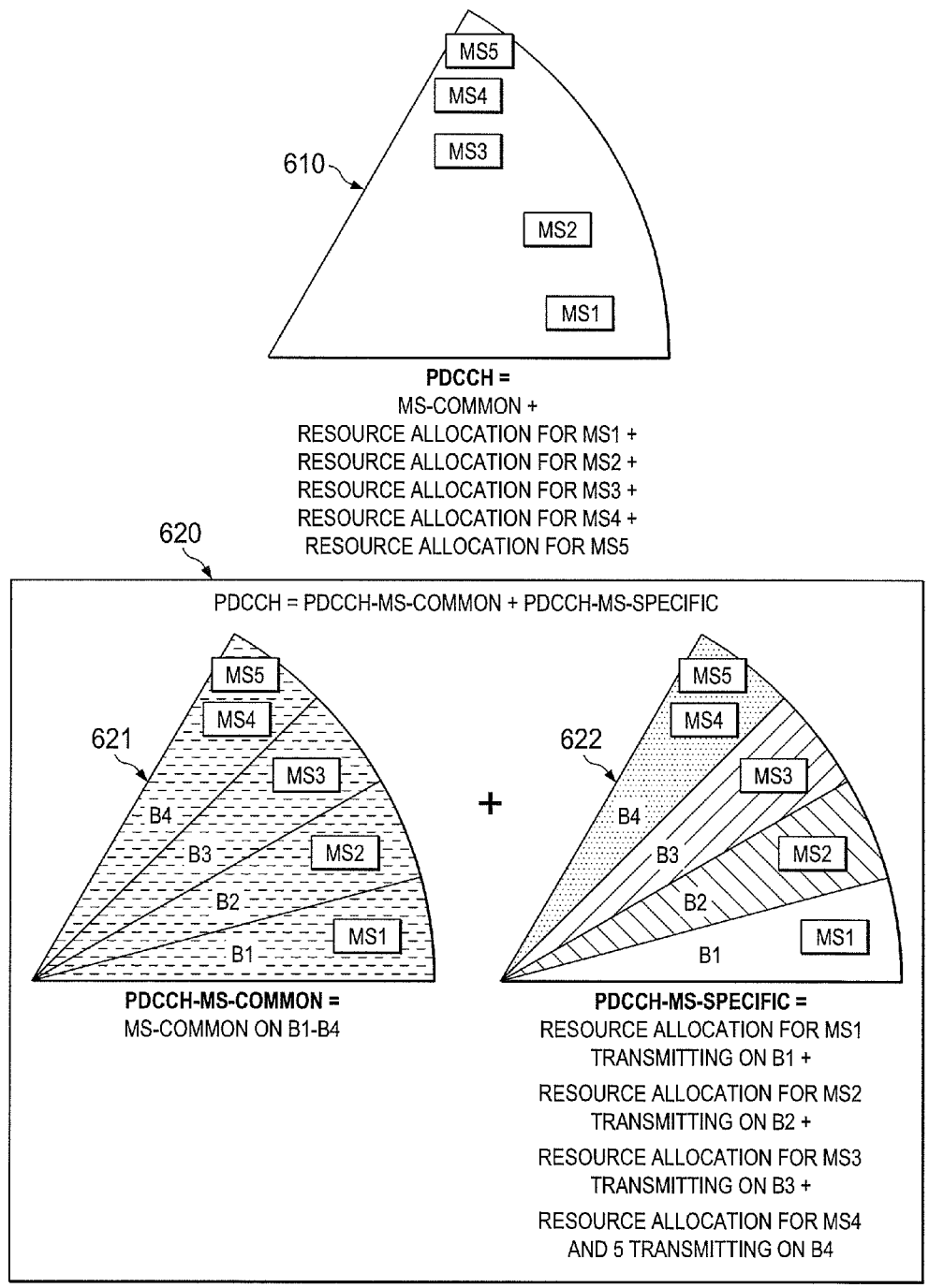
FIG. 6B illustrates the use of beams to carry control information to a mobile station, according to an embodiment of this disclosure.

FIG. 6B illustrates the use of beams to carry control information to a mobile station, according to an embodiment of this disclosure. The embodiment illustrated in FIG. 6B is for illustration only. Other embodiments could be used without departing from the scope of this disclosure.

Control beam 610 depicts a single control beam that carries data control information to a number of mobile stations, MS1-MS5 in a conventional cellular network. The control beam carries the PDCCH for the mobile stations MS1-MS5. The PDCCH includes MS-common information for all mobile stations. The PDCCH also includes resource allocation information for each mobile station MS1-MS5.

In contrast, box 620 depicts a PDCCH format that uses multiple beams in a MMB network. PDCCH 620 includes two parts: PDCCH-MS-common information 621 and PDCCH-MS-specific information 622. The PDCCH-MS-common information 621 is carried on each of four beams B1-B4. The PDCCH-MS-specific information 622 for each MS is carried on one beam corresponding to the location of the intended MS. For example, the PDCCH-MS-specific information 622 for MS1 includes resource allocation information that is transmitted only on beam B1. The PDCCH-MS-specific information 622 for MS4 and MS5 includes is transmitted on beam B5 because MS4 and MS5 are both located in the coverage area of beam B5. The use of narrower beams carrying MS-specific information reduces overhead, which may enhance the reliability of the system.

Figure 7:
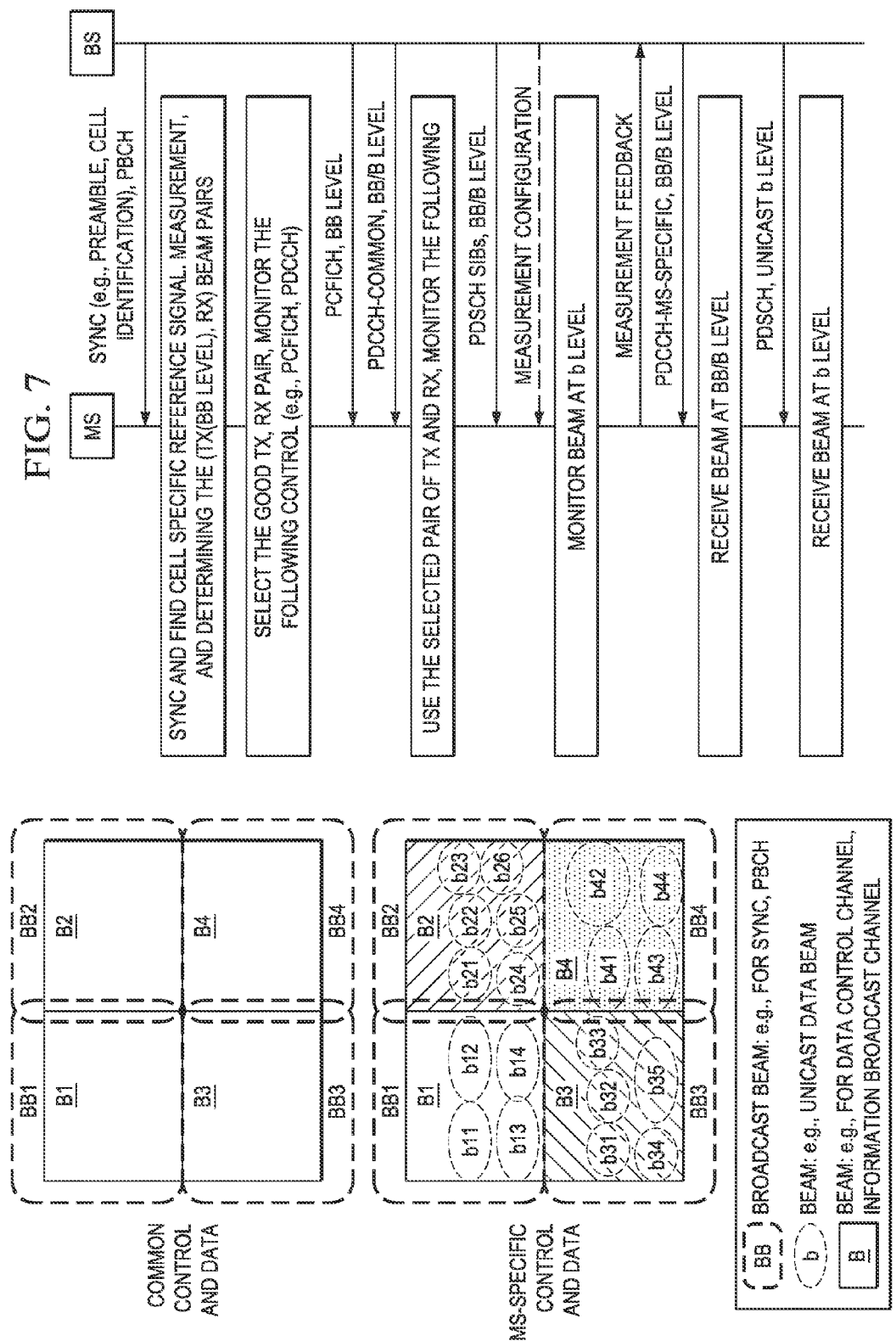
FIG. 7 illustrates a method for monitoring a serving cell where the broadcast beams and the control channel beams use substantially the same beam width, according to embodiments of this disclosure.

FIG. 7 illustrates a method for monitoring a serving cell where the broadcast beams and the control channel beams use substantially the same beam width, according to embodiments of this disclosure. The embodiments illustrated in FIG. 7 are for illustration only. Other embodiments could be used without departing from the scope of this disclosure.

Cells in a millimeter wave communication system can be monitored by using systematic measurements and reporting message exchanges between a BS and MS. As shown in FIG. 7, the MS scans the sync channel transmitted from one or more BSs using BB beams (e.g., BB1-BB4). The sync channel allows the MS to measure the received signal from each BS and connect to the BS with the best measured strength. The reference symbols in the sync channel allow the MS to sync the timing and carrier with the BS, and allow measurement of the TX BB beams. The MS can select one or multiple good TX BB beams to further monitor the physical control format indication channel (PCFICH), which may carry the resource location information for other control channels, such as the PDCCH. By optimizing both the good transmit BB beam and the receive beam, the MS can monitor the PCFICH control channel. It is noted that the receive beam optimization is an optional operation. The absence of beam forming at the receive beam can be considered a subset of receive beam forming where the number of beams is one. In some cases, the PCFICH channel may not be needed in the system; rather, the PBCH may indicate the format or resource location information for the PDCCH and other downlink control channel. In some cases, the PCFICH channel can be named another name but still serve the purpose of indicating the resource location and format information for the other control channels.

Throughout the disclosure, the measurement on the reference signals or reference symbols can be of the measurement metrics, such as the signal to noise ratio (SNR), reference signal received power (RSRP), reference signal received quality (RSRQ), signal to interference and noise ratio (SINR), signal to interference ratio (SIR), and the like.

Once the MS optimizes the transmit BB beam, the MS can further monitor reference symbols to refine the beam to one of the B-level transmit beams (e.g., B1-B4) under the optimized transmit BB Beam. If the BB beam has the same beam width as the B transmit beam, then the refinement from BB to B may not be needed. At the B level, the monitoring is performed by observing the reference symbols in the PDCCHs common search spaces, or PDCCH-common control channel transmitted on all beams. Using the measurement on reference symbols, the MS selects the good B transmit beam and receive beam to monitor the system information blocks (SIBs) transmitted over the data channel (e.g., the physical downlink shared channel (PDSCH) that is transmitted by the BS to the MS). Such SIBs as denoted as PDSCH SIBs. With the reception of the control channels (i.e., PCFICH, PDCCH-common, and PDSCH SIBs), the MS has enough knowledge of the system setting to configure a data connection with the BS.

The MS can attempt to communicate with the BS, and the BS becomes a serving cell of the MS after the success of random access procedure.

For the MS to communicate with the BS, the MS sends the random access signal, and attempts to get the access. The BS can send measurement configuration information to the MS at any stage during the random access procedure. For example, the BS can send the measurement configuration information to the MS in the random access response. The measurement configuration can include the resource allocation or configuration of the reference symbols of B/BB level beams, the measurement metric, the timing (e.g., time duration, periodicity, etc.) for the measurement. The measurement configuration from the BS may be omitted in some cases.

The MS can send measurement information at the B/BB beam level to the BS (e.g., by indicating which B/BB BS TX beams are good ones, or indicating the measurement metrics measured on some of the B/BB TX beams, etc.), at any stage during the random access procedure. For example, the MS can send the measurement information to the BS in the random access request signal or message, together with other information in the random access request signal or message. The MS can also send the measurement information (e.g., the indication of the strong B/BB BS TX beams) to the BS in a standalone message.

After the BS receives the measurement information at the B/BB level from the MS, the BS can decide to which B/BB level beams are suitable to include the MS's specific data control information. That is, the BS can decide the initial attachment of the MS to the B/BB level beams of the BS, where one or multiple of the B/BB level beams carry the MS's specific data control information including the MS's resource allocation information, uplink power control command, and the like. After the success of the random access procedure, the MS will be assigned a temporary MAC identifier, or station identifier, or radio network temporary identifier (RNTI), and the BS will share this identifier with the MS. The BS can then use a CRC attached to the PDCCH carrying the MS's specific information, where the MS's RNTI is encoded in the CRC, and the PDCCH is sent over one or multiple of the B/BB beams determined by the BS that are suitable to transmit the MS's specific control information.

As an alternative, the MS's measurement on the BS b-level narrow beam can be reported by the MS, and the BS can further use b-level beam measurement together with B/BB measurement and other information to decide which B/BB level beam to include the MS's specific control information. The BS can send measurement configuration information to the MS, at any stage during the random access procedure where the measurement configuration can include the resource allocation or configuration of the reference symbols of BB/B level beams, b-level beams, the measurement metric, the timing (e.g., time duration, periodicity, etc.) for the measurement. For example, the BS can send the measurement configuration information to the MS in the random access response. The measurement configuration from the BS may be omitted in some cases.

The MS can send measurement information at the B/BB beam level, b beam level to the BS (e.g., by indicating which B/BB level BS TX beams, b level BS TX beams are good ones, or indicating the measurement metrics measured on some of the B/BB TX beams, b level BS TX beams, etc.), at any stage during the random access procedure. For example, the MS can send the measurement information to the BS in the random access request signal or message, together with other information in the random access request signal or message. The MS can also send the measurement information (e.g., the indication of the strong B/BB BS TX beams, or the strong b-level BS TX beams) to the BS in a standalone message.

After the BS receives the measurement information at the B/BB level, b level from the MS, the BS can decide to which B/BB level beams are suitable to include the MS's specific data control information. That is, the BS can decide the initial attachment of the MS to the B/BB level beams of the BS, where one or multiple of the B/BB level beams carry the MS's specific data control information including the MS's resource allocation information, uplink power control command, and the like. The chosen B/BB level beam or beams can include some good b level beams in their coverage.

After the success of the random access procedure, the MS will be assigned a temporary MAC identifier, or station identifier, or radio network temporary identifier (RNTI), and the BS shares this identifier with the MS. The BS can then use a CRC attached to PDCCH carrying the MS's specific information, where the MS's RNTI is encoded in the CRC, and the PDCCH is sent over one or multiple of the B/BB beams determined by the BS which are suitable to transmit the MS's specific control information.

The MS can set up a PHY layer measurement configuration with the BS that the BS sets up using the optimized B level beam. With this action, the BS sets up a measurement channel containing reference symbols with beams at the b-level that are narrower than the B-level TX beams and are used by the BS for the PDSCH data channel. These reference symbols allow the MS to monitor the b-level transmit beams and select the best b-level transmit beam to receive the PDSCH data transmission. The measurement feedback regarding the best b-level TX beam from the MS informs the BS about the beamforming strategy that the BS should adapt to support transmissions to the MS. The PDCCH-MS-specific information transmitted using the optimized B-level beam indicates the parameters for data transmissions including the resources at which the data is to be transmitted and the beam index of the b-level transmit beam for the data.

Upon receiving the PDCCH-MS-specific information at the beam level BBB, the MS prepares to receive the PDSCH transmitted using the selected b-level transmit beam at the resources specified by the PDCCH-MS-specific information. Thus, the current cell monitoring involves monitoring beams at the BB level, which is used to transmit control channels like PCFICH; at the B level for control information like PDCCH-common, PDCCH SIBs, and PDCCH-MS-specific; and at the b level for unicast PDSCH transmissions.

When the MS is served by a serving cell, the MS may still monitor the BB-level and B-level beams of the serving cell to become synchronized and to get updated system information, perform measurements, and the like.

The PDCCH-common information can include the resource allocation (e.g., resource blocks, power control, and the like) and resource allocation information of the system information blocks (SIBs), which are common to all the MSs in the cell. The PDCCH-MS-specific information can include the resource allocation, etc., to a certain MS.

The PDCCH-common channel can be a channel including all the common information in the PDCCH to all the MSs, or a channel including part of the common information in the PDCCH to all the MSs. In some cases, the PDCCH-common channel may be the common search spaces for the PDCCHs carrying the PDCCH-common information. The PDCCH-MS-specific channel can be a channel including the resource allocation to a specific MS, or it can also contain information in the PDCCH that is common to all the MSs. In some cases, the PDCCH-MS-specific channel may be the MS-specific search spaces for the PDCCHs carrying the PDCCH-MS-specific information. The PDCCH-common channel and PDCCH-MS-specific channel can have the same or different physical format (e.g., the same CRC or different CRC).

FIG. 8 illustrates a method for monitoring a serving cell where the broadcast beams and the control channel beams use different beam widths, according to embodiments of this disclosure.

As shown in FIG. 8, if a broadcast (BB-level) beam and a control channel (B-level) beam use different beam widths, the MS, after monitoring the BB-level beam, may use the selected good TX-RX pair to monitor the B-level beam. The other procedures are similar to or the same as those in the embodiments illustrated by FIG. 7. The embodiments related to FIG. 8 are similar to those illustrated by FIG. 7, with B-level beam using different beam width of BB level. A number of scenarios as extensions of the embodiments illustrated by FIGS. 7 and 8 are now described.

In a first scenario, B-level beams and BB-level beams have the same beam-width and are optimized during the sync transmission from the BS to the MS.

In a second scenario, the current cell monitoring includes transmitting reference symbols using transmit beams at the BB-level contained in the control channels. The control information may include PDCCH-common, PDCCH SIBs, or PDCCH-MS-specific that all transmit substantially the same information on the downlink to the MSs.

In a third scenario, the monitoring of the cell to which the BS is connected includes transmitting reference symbols using transmit beams at the BB-level contained in the control channels. The control information may include PDCCH-common, PDCCH SIBs, or PDCCH-MS-specific that transmit different information on the different BB beams to the MS.

In a fourth scenario, the PHY layer measurement configuration that the BS configures for the MS to measure and select the best b-level transmit beam could be configured for each MS independently by selecting the MS to train on all b-level transmit beams under the selected B-level transmit beam, or on a sub-set of b-level transmit beams under the selected B-level transmit beam.

In a fifth scenario, the PHY layer measurement configuration that the BS configures for all MSs to measure and select the best b-level transmit beam could be configured as a common reference symbol transmission channel to all MSs while provisioning for exclusive feedback channels for each of the MSs to indicate the best b-level transmit beam.

Figure 10A:
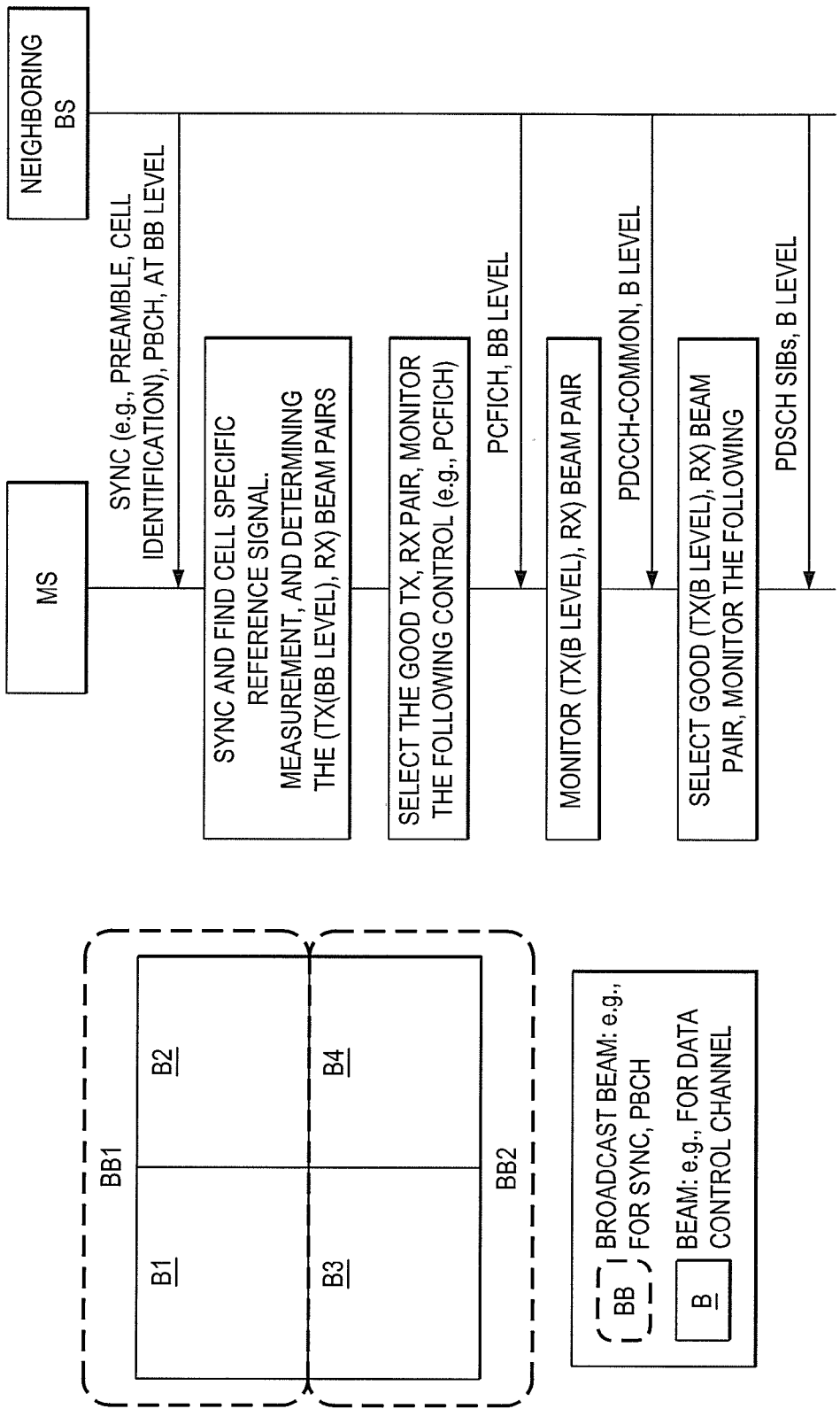

FIGS. 9A, 9B, 10A, and 10B illustrate cell monitoring in idle mode or initial network entry, according to embodiments of this disclosure. In FIGS. 9A and 9B, the BB-level beams and the B-level beams have the same beam width. In FIGS. 10A and 10B, the BB-level beams and the B-level beams have different beam widths. In FIGS. 9A and 10A, the control beams carry the same information. In FIGS. 9B and 10B, the control beams carry different information. The embodiments illustrated in FIGS. 9A, 9B, 10A, and 10B are for illustration only. Other embodiments could be used without departing from the scope of this disclosure.

In the initial network entry (or network reentry), the MS scans the sync channel transmitted from the BS using wide BB beams (e.g., beams BB1, BB2). The sync channel allows the MS to measure the received signal from each BS and connect to the BS with the best measured strength. The reference symbols in the sync channel allow the MS to sync the timing and carrier with the BS, and allow measurement of the TX BB beams. The MS can select one or more good TX BB beams to further monitor the PCFICH, which may carry the resource location information for other control channels, such as the PDCCH. By optimizing both the good transmit BB beam and the receive beam, the MS can monitor the PCFICH control channel. It is noted that the receive beam optimization is an optional operation. The absence of beam forming at the receive beam can be considered a subset of receive beam forming where the number of beams is one.

Once the MS optimizes the transmit BB Beam, the MS can further monitor reference symbols to refine the beam to one of the B-level transmit beams (e.g., B1-B4) under the optimized transmit BB Beam. If the BB Beam has the same beam width as the B transmit beam, then the refinement from BB to B may not be needed. At the B level, the monitoring is performed by observing the reference symbols in the PDCCH-common control channel transmit on all beams. Using the reference symbols, the MS selects the good B transmit beam and receive beam to monitor the system information blocks (SIBs) transmitted over the data channel (e.g., the PDSCH that is transmitted by the BS to the MS). Such SIBs are denoted as PDSCH SIBs. With the reception of the control channels (i.e., PCFICH, PDCCH-common, and PDSCH SIBs), the MS has enough knowledge of the system setting to configure a data connection with the BS.

When the MS is in idle mode, the MS may use a similar procedure to monitor cells. When the MS monitors the neighboring cells when the MS is connected with the serving cell, the MS can monitor the cells using a similar procedure.

Figure 11:
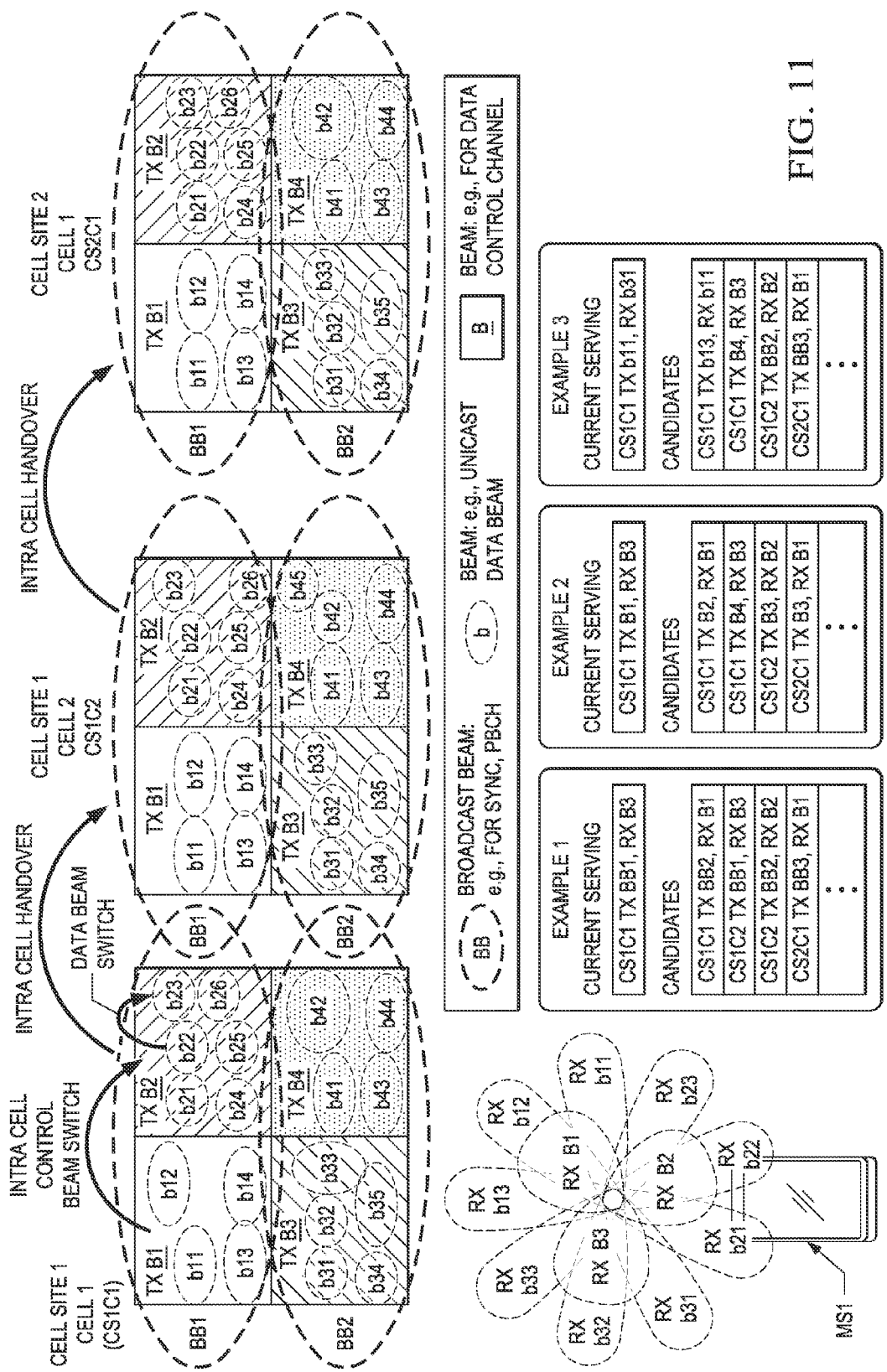
FIG. 11 illustrates a number of examples of beam and cell monitoring and handovers, according to an embodiment of this disclosure.

FIG. 11 illustrates a number of examples of beam and cell monitoring and handovers, according to an embodiment of this disclosure. The embodiment illustrated in FIG. 11 is for illustration only. Other embodiments could be used without departing from the scope of this disclosure.

After monitoring cells and beams, a MS can perform corresponding operations, such as a data beam switch, intra-cell control beam switch, intra-cell handover, inter-cell handover, and the like. In one scenario, the MS monitors one or more serving cells and neighboring cells at the BB-level and the B-level beams. When certain conditions are met, the MS can handover to neighboring cells at cell sites different from the serving cell (i.e., an inter-cell handover). In another scenario, the MS monitors neighboring cells at the same cell site as the serving cell. When certain conditions are met, the MS can handover to the cells at the same cell site as the serving cell (intra-cell handover). The conditions to be met may include one or more of the following:

the neighboring cells have beams at BB-level or B-level with stronger signals than the serving cells by a certain threshold;

the signal-to-interference ratio of BB-level or B-level beams from neighboring cells are stronger than those from the serving cells by a certain threshold; and the signal-to-interference-and-noise ratio of BB-level or B-level beams from neighboring cells are stronger than those from the serving cells by a certain threshold.

The conditions to be met for an intra-cell handover and an inter-cell handover may be different. For example, the condition(s) for an inter-cell handover may be more stringent than the condition(s) for an intra-cell handover (e.g., a larger threshold for the difference of the stronger beam from the neighboring cell and the weaker beam from the current serving cell), such that the intra-cell handover has a higher priority than the inter-cell handover.

The measurement of the BB-level or B-level beams of a cell can be used to indicate a cell's measurement. For example, a cell's measurement can be indicated by the best BB-level or B-level beam, or multiple good BB-level or B-level beams, or an average of multiple good BB-level or B-level beams. The conditions above can be based on BB-level or B-level beam measurement, or based on the cell's measurement. The measurement of beams (e.g., to determine a "stronger" or "weaker" beam) may include the signal strength of the beams, the signal-to-interference ratio of the beams, the signal-to-interference-and-noise ratio of the beams, and the like. The measurement of beams can be based on one or more transmit beams, more or more receive beams, or a combination of transmit and receive beams. For example, one measurement may determine the strongest pair of transmit and receive beams.

The MS may also monitor a serving cell's data control beams. The data control beams can be, e.g., at the B level. When certain conditions are met, the serving cell may request the MS to switch (or the MS may request to switch, or the MS may switch) to other data control beams within the cell. The conditions to be met may include, e.g., the current data control beam(s) are weaker than other data control beams within the cell by a certain threshold, or other data control beams within the cell are stronger than the current data control beams. The measurement of beams (e.g., to determine a "stronger" or "weaker" beam) may include a number of metrics, e.g., the signal strength of the beams, the signal-to-interference ratio of the beams, the signal-to-interference-and-noise ratio of the beams, and the like. The measurement of beams can be based on one or more transmit beams, one or more receive beams, or a combination of transmit and receive beams. For example, one measurement may determine the strongest pair of transmit and receive beams.

The MS may also perform a data beam switch within a data control beam. This can be performed by measurement of the beams at the level of narrow beams (e.g., at the b-level). The narrow beams can be at the transmitter, the receiver, or both. The measurement of the beams can be based on one or more reference signals. When certain conditions are met, the serving cell may request the MS to switch (or the MS may request to switch, or the MS may switch) to other data beams within the cell.

The MS may monitor the beams and cells and maintain a list of the serving and the candidate beams and/or cells, for operations such as a data beam switch, intra-cell control beam switch, intra-cell handover, inter-cell handover, and the like.

Examples 1, 2, 3 in FIG. 11 illustrate examples of a list that a MS may maintain. The list may also include measurement results. In each example, pairs of transmit and receive beams are used. In Example 1, transmit beam monitoring is at BB-level, and receive beam monitoring is at B-level. In Example 2, transmit beam monitoring is at B-level, and receive beam monitoring is at B-level. In Example 3, the list can be a mix of different levels of the transmit and receive beams, e.g., transmit beam monitoring at b-level, receive beam monitoring at b-level; transmit monitoring at B-level and receive monitoring at B-level; and transmit monitoring at BB-level and receive monitoring at B-level.

Figure 12:
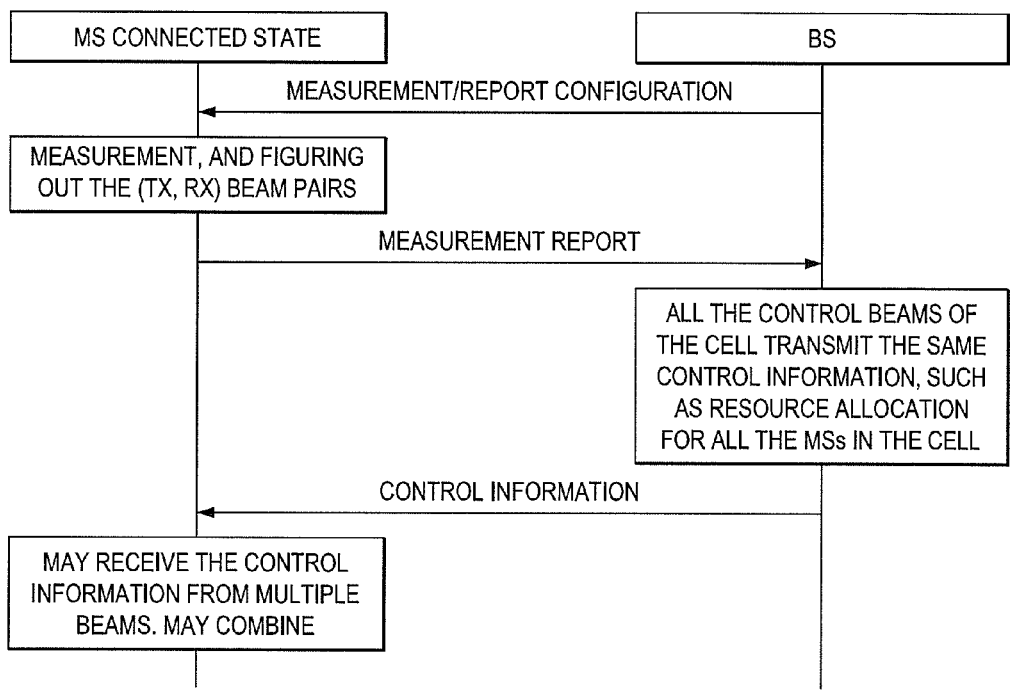
FIG. 12 depicts a signal flow diagram illustrating a mobile station combining multiple beams that transmit the same control information, according to an embodiment of this disclosure.

FIG. 12 depicts a signal flow diagram illustrating a mobile station combining multiple beams that transmit the same control information, according to an embodiment of this disclosure. In the embodiment, a base station may configure all control beams, such as the data control beams, to transmit the same control information. The mobile station may receive the control information from one or multiple beams. The mobile station may then combine the beams to determine the control information. The embodiment illustrated in FIG. 12 is for illustration only. Other embodiments could be used without departing from the scope of this disclosure.

As shown in FIG. 12, with the MS in a connected state, the base station sends measurement and report configuration to the MS. The MS performs measurements on beams and cells, and sends a measurement report to the BS. The BS can have all the control beams of the cell transmit the same control information, such as resource allocation for all the MSs in the cell. The MS may receive the control information from one or multiple beams. The MS may then combine the beams to get the control information.

The PDCCH-common information can be sent and received in this manner. The PDCCH-MS-specific information can also be sent and received in this manner if each of the beams in a cell carries the same information, i.e., all the resource allocation information for all the MSs in the cell.

Figure 13:
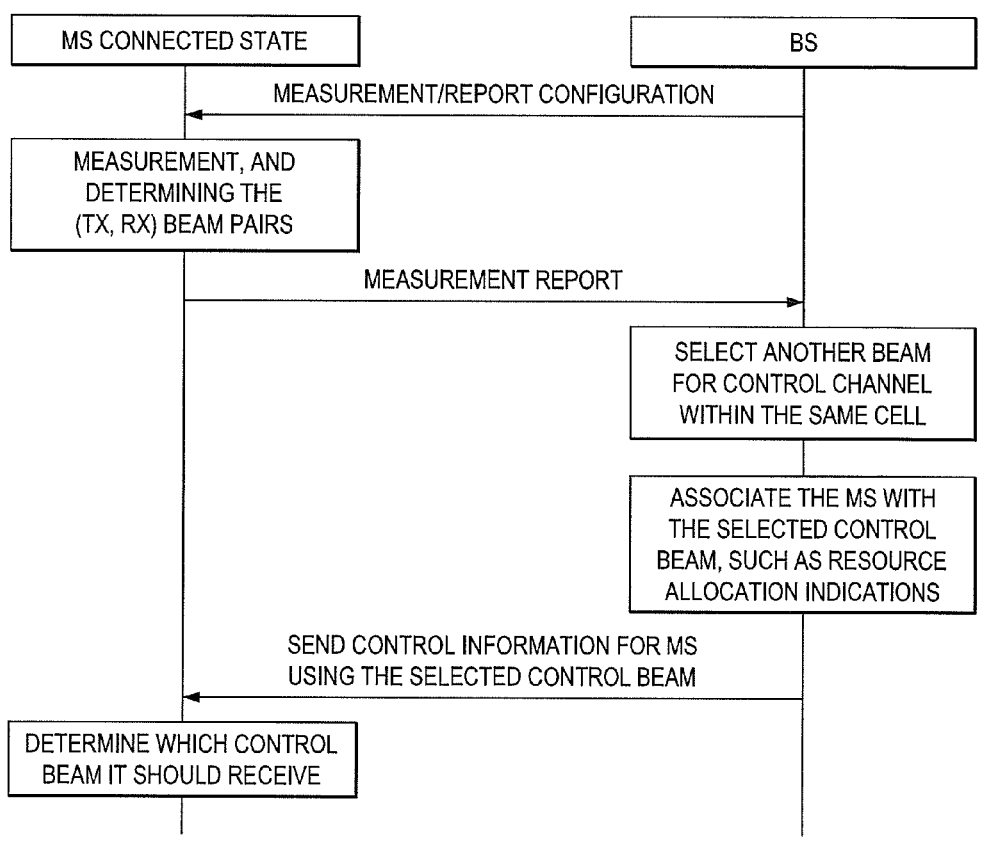
FIG. 13 depicts a signal flow diagram illustrating intra-cell control beam switch, according to an embodiment of this disclosure.

FIG. 13 depicts a signal flow diagram illustrating intra-cell control beam switch, according to an embodiment of this disclosure. In the embodiment, the BS switches the control beam for the MS, and the MS determines the switch by itself, e.g., via blind decoding. The embodiment illustrated in FIG. 13 is for illustration only. Other embodiments could be used without departing from the scope of this disclosure.

A base station may configure all control beams, such as the data control beams, to transmit different control information, such as the control information that indicates the resource allocation for MSs who are associated with the control beam. Each MS can be associated with one or multiple control beams. When a MS is associated with one control beam, the MS can acquire the MS related information from the received beam. When there are multiple control beams that an MS is associated with, the MS may process the multiple beams jointly to get the control information.

When certain conditions are met, a MS may be switched to one or more different control beams. The conditions may be, e.g., that the control beam or beams that the MS is associated with are weaker than other control beams by a certain threshold. Here the measurement may be based on a number of metrics, e.g., signal strength, signal-to-interference ratio, signal-to-interference-and-noise ratio, and the like.

As shown in FIG. 13, with the MS in a connected state, the base station sends measurement and report configuration to the MS. The MS performs measurement on beams and cells, and sends a measurement report to the BS. Based on the measurement, the BS may determine that the MS should be switched to another beam for a control channel within the same cell. The BS and the network can select the beam for the control channel for the MS to be associated with, within the same cell. The BS prepares for the association of the MS with the selected control beam, such as by including the resource allocation indications for the MS in the control information transmitted in the selected control beam. The BS then sends the control information to the MS using the selected control beam. The MS then determines which control beam it should receive. For example, the MS may use blind decoding to attempt to decode multiple control beams and determine which control beam includes its information. The MS may then associate itself to the control beam. The PDCCH-MS-specific information may also be sent, received, and switched in accordance with this embodiment.

Figure 14:
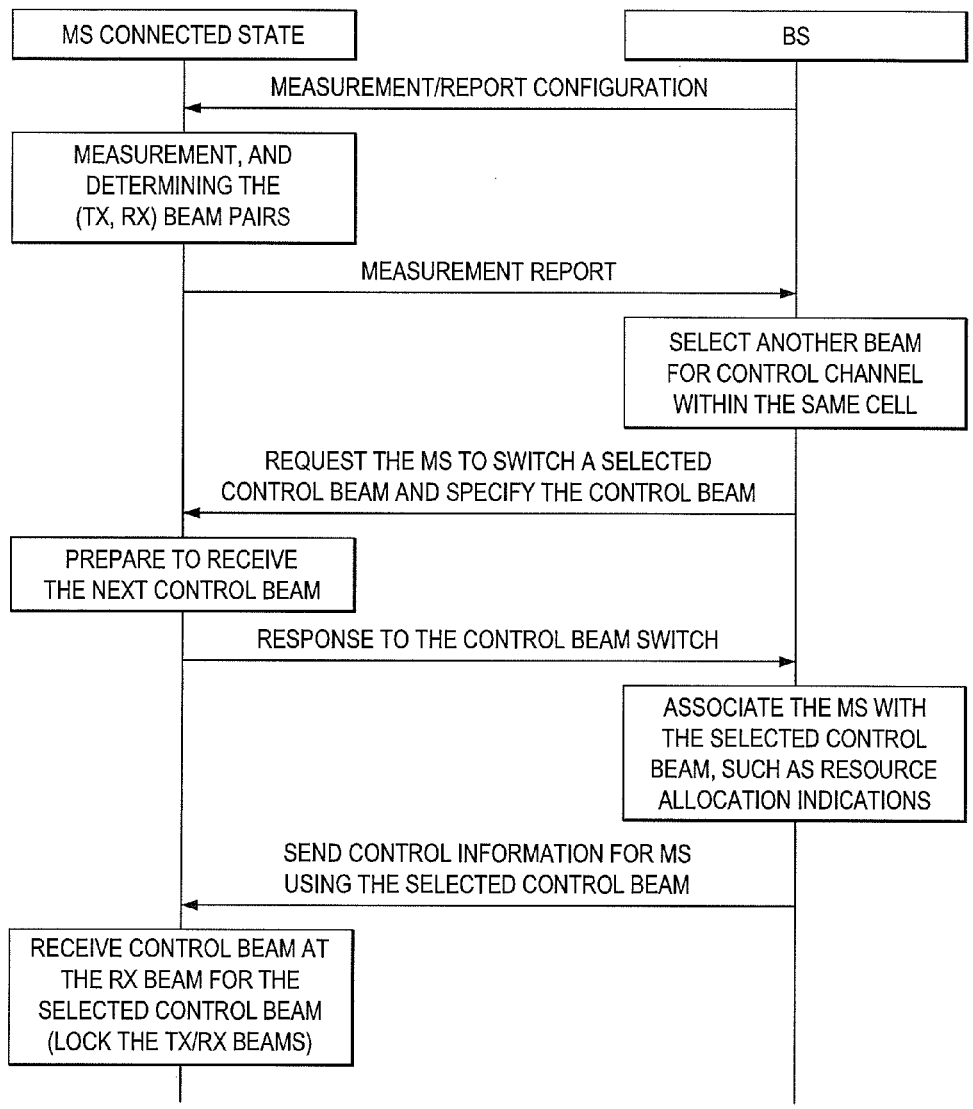
FIG. 14 depicts a signal flow diagram illustrating intra-cell control beam switch, according to another embodiment of this disclosure.

FIG. 14 depicts a signal flow diagram illustrating intra-cell control beam switch, according to another embodiment of this disclosure. In this embodiment, the BS informs the MS about the control beam switch before switching the control beam for the MS. The MS then performs a prepared control beam switch. The embodiment illustrated in FIG. 14 is for illustration only. Other embodiments could be used without departing from the scope of this disclosure.

The BS and the network can select the beam for the control channel for the MS to be associated with, within the same cell. The BS then transmits a request to the MS to switch to a selected control beam. The BS can specify the selected control beam in the message to the MS. After receiving the message, the MS prepares to receive the next control beam, i.e., the BS selected control beam. The MS may send a response to the BS regarding the control beam switch. The BS also prepares for the control beam association of the MS to the selected control beam. For example, the BS may include one or more resource allocation indications for the MS in the control information transmitted in the selected control beam. The BS then sends the control information to the MS using the selected control beam. The MS receives the new control beam with a receive beam. The receive beam may already be locked for the new control beam during the monitoring or measurement stage. The PDCCH-MS-specific information can also be sent, received, and switched in this manner.

In a variation of this embodiment, the BS selects multiple candidate beams for control channel within the same cell.

In one embodiment of this disclosure, the MS-related information (e.g., the resource allocation information) is sent in both the current and candidate control beams, for a certain time, until the control beam switch is completed. One advantage is that the MS may have more opportunities to be associated with the control beam, and the chance of losing the control beam is reduced.

In some embodiments, for intra-cell or inter-cell handover, a handshake for beam locking may be needed.

In some embodiments, in idle mode, the MS can monitor the beams from the base stations. After monitoring, if the MS determines to send information to the base station (e.g., information associated with a MS location update, response to paging, etc.), the MS can send the information in one or multiple TX beams. The MS can send the information in all of its TX beams, by steering the TX beams, or by concurrent TX beams, so that at least one of the RX beams at the BS can receive the information if the BS holds one of its RX beams during the time that the MS steers its TX beams. In one alternative, the MS sends the information in one of its TX beams and repeats the information multiple times, so that at least one of the RX beams at the BS can receive it when the BS is steering its RX beams. In another alternative, before the MS sends the information, the MS sends training beams to the BS so as to get the MS TX beam to lock to the BS RX beam, and after the beam locking, the MS can send the detailed information on the locked or trained beam.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use by a base station in a wireless network, a method for associating control beams to a mobile station, the method comprising:
   transmitting at least one first control beam including reference signals on which the mobile station can perform a measurement;
   receiving a first measurement report from the mobile station of the at least one first control beam;
   based on the first measurement report, selecting at least one of the at least one first control beam for at least one control channel for the mobile station to associate with; and
   transmitting control information in the at least one control channel to the mobile station using the at least one selected control beam, the control information comprising at least one resource allocation indication for the mobile station,
   wherein the at least one selected control beam is associated to the mobile station;
   transmitting a measurement and report configuration to the mobile station; and
   receiving a second measurement report from the mobile station, the second measurement report comprising a measurement by the mobile station of at least one second control beam associated with a control channel and at least one candidate control beam.

2. The method of claim 1, wherein transmitting control information in the at least one control channel to the mobile station using the at least one selected control beam comprises:
   including a cyclic redundancy code (CRC) encoded by a radio network temporary identifier (RNTI) of the mobile station to the at least one control channel after the RNTI is assigned to the mobile station upon a success of a random access procedure of the mobile station; and
   transmitting the at least one selected control beam to the mobile station,
   wherein the transmitted control information is configured to be decoded by the mobile station using blind decoding, and
   wherein the transmitted control information comprises at least one resource allocation indication for the mobile station and at least one uplink power control command for the mobile station.

3. The method of claim 1, further comprising:
   receiving a second measurement report from the mobile station of at least one second control beam for control information during a random access procedure, wherein the at least one second control beam is a control beam that the mobile station has not associated with.

4. The method of claim 1, further comprising:
   based on the second measurement report, selecting at least one third control beam for the control channel for the mobile station to associate with, the at least one third control beam being within a same cell as the at least one second control beam; and
   transmitting control information to the mobile station using the at least one third control beam, the control information comprising at least one resource allocation indication for the mobile station,
   wherein the at least one third control beam is associated to the mobile station.

5. The method of claim 4, further comprising:
   transmitting a request to the mobile station to switch to the at least one third control beam and receiving a confirmation of the switch from the mobile station.

6. The method of claim 4, further comprising:
   determining to switch to the at least one third control beam when a difference between a signal strength of the at least one third control beam and a signal strength of the at least one second control beam exceeds a predetermined threshold.

7. The method of claim 1, further comprising:
   communicating with the mobile station using a wide beam during the mobile station's initial network entry or network reentry, and communicating with the mobile station using a narrower beam after associating with the mobile station.

8. A base station configured to associate control beams to a mobile station in a wireless network, the base station comprising:
a processor configured to:
transmit at least one first control beam including reference signals on which the mobile station can perform a measurement;
receive a first measurement report from the mobile station of the at least one first control beam;
based on the first measurement report, select at least one of the at least one first control beam for at least one control channel for the mobile station to associate with; and
transmit control information in the at least one control channel to the mobile station using the at least one selected control beam, the control information comprising at least one resource allocation indication for the mobile station,
wherein the at least one selected control beam is associated to the mobile station;
transmit a measurement and report configuration to the mobile station; and
receive a second measurement report from the mobile station, the second measurement report comprising a measurement by the mobile station of at least one second control beam associated with a control channel and at least one candidate control beam.

9. The base station of claim 8, wherein to transmit control information in the at least one control channel to the mobile station using the at least one selected control beam, the processor is further configured to:
include a cyclic redundancy code (CRC) encoded by a radio network temporary identifier (RNTI) of the mobile station to the at least one control channel after the RNTI is assigned to the mobile station upon a success of a random access procedure of the mobile station; and
transmit the at least one selected control beam to the mobile station,
wherein the transmitted control information is configured to be decoded by the mobile station using blind decoding, and
wherein the transmitted control information comprises at least one resource allocation indication for the mobile station and at least one uplink power control command for the mobile station.

10. The base station of claim 8, the processor further configured to:
receive a second measurement report from the mobile station of at least one second control beam for control information during a random access procedure, wherein the at least one second control beam is a control beam that the mobile station has not associated with.

11. The base station of claim 8, the processor further configured to:
based on the second measurement report, select at least one third control beam for the control channel for the mobile station to associate with, the at least one third control beam being within a same cell as the at least one second control beam; and
transmit control information to the mobile station using the at least one third control beam, the control information comprising at least one resource allocation indication for the mobile station,
wherein the at least one third control beam is associated to the mobile station.

12. The base station of claim 11, the processor further configured to:
transmit a request to the mobile station to switch to the at least one third control beam and receiving a confirmation of the switch from the mobile station.

13. The base station of claim 11, the processor further configured to:
determine to switch to the at least one third control beam when a difference between a signal strength of the at least one third control beam and a signal strength of the at least one second control beam exceeds a predetermined threshold.

14. The base station of claim 8, the processor further configured to:
communicate with the mobile station using a wide beam during the mobile station's initial network entry or network reentry, and communicating with the mobile station using a narrower beam after associating with the mobile station.

15. For use by a mobile station in a wireless network, a method for associating control beams, the method comprising:
receiving from a base station at least one first control beam comprising a plurality of reference signals;
performing a measurement on the reference signals;
transmitting a first measurement report of the at least one first control beam, the first measurement report configured to be used by the base station to select at least one of the at least one first control beam for at least one control channel for the mobile station to associate with; and
receiving control information in the at least one control channel using the at least one selected control beam, the control information comprising at least one resource allocation indication for the mobile station,
wherein the at least one selected control beam is associated to the mobile station;
receiving a measurement and report configuration from a base station;
performing a measurement of at least one second control beam associated with a control channel and at least one candidate control beam; and
transmitting a second measurement report to the base station, the second measurement report comprising the measurement.

16. The method of claim 15, wherein the at least one control channel comprises a cyclic redundancy code (CRC) encoded by a radio network temporary identifier (RNTI) of the mobile station after the RNTI is assigned to the mobile station upon a success of a random access procedure of the mobile station,
wherein the received control information comprises at least one resource allocation indication for the mobile station and at least one uplink power control command for the mobile station,
the method further comprising decoding the received control information using blind decoding.

17. The method of claim 15, further comprising:
transmitting a second measurement report to the base station of at least one second control beam for control information during a random access procedure, wherein the at least one second control beam is a control beam that the mobile station has not associated with.

18. The method of claim 15, further comprising:
receiving control information from the base station using at least one third control beam, the at least one third control beam selected for the control channel by the base station based on the measurement report, the at least one third control beam being within a same cell as the at least one second control beam, the control information comprising at least one resource allocation indication; and
associating with the at least one third control beam.

19. The method of claim 18, further comprising:
receiving a request from the base station to switch to the at least one third control beam and transmitting a confirmation of the switch to the base station.

20. The method of claim 18, wherein the at least one third control beam is selected when a difference between a signal strength of the at least one third control beam and a signal strength of the at least one second control beam exceeds a predetermined threshold.

21. The method of claim 15, further comprising:
communicating with the base station using a wide beam during initial network entry or network reentry, and communicating with the base station using a narrower beam after associating with the base station.

22. A mobile station configured to associate control beams in a wireless network, the mobile station comprising:
a processor configured to:
receive from a base station at least one first control beam comprising a plurality of reference signals;
perform a measurement on the reference signals;
transmit a first measurement report of the at least one first control beam, the first measurement report configured to be used by the base station to select at least one of the at least one first control beam for at least one control channel for the mobile station to associate with; and
receive control information in the at least one control channel using the at least one selected control beam, the control information comprising at least one resource allocation indication for the mobile station,
wherein the at least one selected control beam is associated to the mobile station;
receive a measurement and report configuration from a base station;
perform a measurement of at least one second control beam associated with a control channel and at least one candidate control beam; and
transmit a second measurement report to the base station, the second measurement report comprising the measurement.

23. The mobile station of claim 22, wherein the at least one control channel comprises a cyclic redundancy code (CRC) encoded by a radio network temporary identifier (RNTI) of the mobile station after the RNTI is assigned to the mobile station upon a success of a random access procedure of the mobile station,
wherein the received control information comprises at least one resource allocation indication for the mobile station and at least one uplink power control command for the mobile station,
the processor further configured to decode the received control information using blind decoding.

24. The mobile station of claim 22, the processor further configured to:
transmit a second measurement report to the base station of at least one second control beam for control information during a random access procedure, wherein the at least one second control beam is a control beam that the mobile station has not associated with.

25. The mobile station of claim 22, the processor further configured to:
receive control information from the base station using at least one third control beam, the at least one third control beam selected for the control channel by the base station based on the measurement report, the at least one third control beam being within a same cell as the at least one second control beam, the control information comprising at least one resource allocation indication; and
associate with the at least one third control beam.

26. The mobile station of claim 25, the processor further configured to receive a request from the base station to switch to the at least one third control beam and transmitting a confirmation of the switch to the base station.

27. The mobile station of claim 25, wherein the at least one third control beam is selected when a difference between a signal strength of the at least one third control beam and a signal strength of the at least one second control beam exceeds a predetermined threshold.

28. The mobile station of claim 22, the processor further configured to:
communicate with the base station using a wide beam during initial network entry or network reentry, and communicating with the base station using a narrower beam after associating with the base station.

* * * * *